United States Patent
Krohn

(10) Patent No.: US 8,109,539 B2
(45) Date of Patent: Feb. 7, 2012

(54) VARIABLE JOINING DEVICE AND METHOD FOR ITS USE

(76) Inventor: Kenneth P. Krohn, Oceanside, CA (US)

( * ) Notice: Subject to any disclaimer, the term of this patent is extended or adjusted under 35 U.S.C. 154(b) by 1162 days.

(21) Appl. No.: 11/879,346

(22) Filed: Jul. 17, 2007

(65) Prior Publication Data
US 2009/0019680 A1 Jan. 22, 2009

(51) Int. Cl.
F16L 21/06 (2006.01)
(52) U.S. Cl. .......................... 285/322; 285/8
(58) Field of Classification Search ............. 285/148.19, 285/346, 105, 109, 95, 8, 345, 322
See application file for complete search history.

(56) References Cited

U.S. PATENT DOCUMENTS

| | | | | | |
|---|---|---|---|---|---|
| 196,370 | A | * | 10/1877 | MacQueen, Jr. | 210/449 |
| 589,362 | A | * | 8/1897 | Miles | 277/322 |
| 1,071,165 | A | * | 8/1913 | Manning | 417/181 |
| 1,586,923 | A | * | 6/1926 | Townsend | 166/77.4 |
| 1,634,891 | A | * | 7/1927 | Trout | 277/329 |
| 1,814,020 | A | * | 7/1931 | Armstrong | 239/552 |
| 1,873,590 | A | * | 8/1932 | James | 277/625 |
| RE20,706 | E | * | 4/1938 | Aghnides | 285/8 |
| RE20,782 | E | * | 7/1938 | Hooper | 285/8 |
| 2,129,704 | A | * | 9/1938 | Meyer | 285/33 |
| 2,207,619 | A | | 7/1940 | Hildebrand | |
| 2,257,895 | A | * | 10/1941 | Woodford et al. | 137/801 |
| 2,396,078 | A | * | 3/1946 | Box | 285/231 |
| 2,416,657 | A | * | 2/1947 | Trevaskis | 285/109 |
| 2,447,663 | A | * | 8/1948 | Payne | 277/388 |
| 2,493,577 | A | * | 1/1950 | Franklin | 285/8 |
| 2,508,827 | A | * | 5/1950 | Holden | 285/8 |
| 2,525,419 | A | * | 10/1950 | McLlinger et al. | 604/118 |
| 2,529,821 | A | * | 11/1950 | Snider | 285/361 |
| 2,584,044 | A | * | 1/1952 | Osrow et al. | 285/8 |
| 2,688,499 | A | * | 9/1954 | Hanson | 277/615 |
| 2,711,331 | A | * | 6/1955 | Temple | 285/8 |
| 2,758,852 | A | | 8/1956 | Newell | |
| 2,821,413 | A | * | 1/1958 | Krapp | 285/18 |
| 2,894,768 | A | * | 7/1959 | Davis | 285/39 |
| 3,271,053 | A | * | 9/1966 | Kurachi | 285/8 |
| 3,633,944 | A | | 1/1972 | Hamburg | |
| 3,707,301 | A | * | 12/1972 | Rauls | 285/9.2 |
| 3,744,822 | A | | 7/1973 | Arnold | |
| 3,830,533 | A | | 8/1974 | Mezei et al. | |
| 3,847,214 | A | | 11/1974 | Cushman | |

(Continued)

OTHER PUBLICATIONS

Rain Bird Easy Fit Compression Fitting Product Bulletin, date unknown, 2 pages see http://wwvv.rainbird.com/drip/products/distribution/easyfit.htm.

(Continued)

*Primary Examiner* — Aaron Dunwoody

(57) ABSTRACT

An adjustable or variable joining device (such as a fitting or connector) used to connect a duct (such as pipe or tubing) having a range of shapes, sizes and thread styles to an object (such as equipment, a container, or another length of pipe or tubing). In various embodiments, the device may generally comprise a sealing member, a support assembly, and a support plate. The sealing member is adapted to seal the duct to the device by elastically expanding to fit around the exterior surface of the duct. The support plate, which is placed adjacent to the interior surface of the sealing member, protects the sealing member and prevents it from collapsing under thrust loads. The support assembly is positioned on the outside of the sealing member and assists in operatively holding the sealing member in place. The device may also comprise a casing member, which encloses the above members.

61 Claims, 8 Drawing Sheets

U.S. PATENT DOCUMENTS

| Number | Type | Date | Name | Ref |
|---|---|---|---|---|
| 3,917,318 | A | 11/1975 | Legris | |
| 3,998,478 | A | 12/1976 | Zopfi | |
| 4,037,864 | A | 7/1977 | Anderson et al. | |
| 4,054,157 | A * | 10/1977 | Moseley, Jr. | 138/42 |
| 4,084,843 | A * | 4/1978 | Gassert | 285/105 |
| 4,140,415 | A | 2/1979 | Koyamato et al. | |
| 4,146,254 | A | 3/1979 | Turner et al. | |
| 4,165,109 | A | 8/1979 | Foti | |
| 4,257,629 | A | 3/1981 | Maple | |
| 4,269,437 | A * | 5/1981 | Shaw et al. | 285/109 |
| 4,298,206 | A | 11/1981 | Kojima | |
| 4,311,314 | A | 1/1982 | Suman | |
| 4,313,828 | A * | 2/1982 | Brownlee | 210/198.2 |
| 4,466,640 | A | 8/1984 | Van Houtte | |
| 4,483,555 | A | 11/1984 | Ludwig | |
| 4,505,499 | A | 3/1985 | Uglow | |
| 4,508,369 | A | 4/1985 | Mode | |
| 4,561,682 | A | 12/1985 | Tisserat et al. | |
| D283,342 | S | 4/1986 | Tisserat et al. | |
| 4,579,353 | A * | 4/1986 | Bower | 277/615 |
| 4,591,192 | A | 5/1986 | Van Exel et al. | |
| 4,593,943 | A | 6/1986 | Hama | |
| 4,614,371 | A * | 9/1986 | Bauder | 285/231 |
| 4,622,703 | A | 11/1986 | Cuschera | |
| 4,657,286 | A | 4/1987 | Guest | |
| 4,678,208 | A | 7/1987 | De Raymond | |
| 4,721,330 | A | 1/1988 | Woodhouse | |
| 4,722,560 | A | 2/1988 | Guest | |
| 4,779,904 | A * | 10/1988 | Rich | 285/345 |
| 4,805,932 | A | 2/1989 | Imhof | |
| 4,919,457 | A | 4/1990 | Moretti | |
| 4,946,213 | A | 8/1990 | Guest | |
| 5,087,081 | A * | 2/1992 | Yoon | 285/8 |
| 5,121,949 | A | 6/1992 | Reese | |
| 5,131,632 | A | 7/1992 | Olson | |
| 5,156,423 | A | 10/1992 | Gifford | |
| 5,161,835 | A | 11/1992 | Yoshinori | |
| 5,171,045 | A | 12/1992 | Pasbrig | |
| 5,172,943 | A | 12/1992 | Shimada | |
| 5,248,172 | A | 9/1993 | Wilson | |
| 5,267,759 | A | 12/1993 | Prokop et al. | |
| 5,284,582 | A * | 2/1994 | Yang | 210/232 |
| 5,320,326 | A | 6/1994 | Ju et al. | |
| 5,322,331 | A | 6/1994 | Waldschmidt et al. | |
| 5,328,213 | A | 7/1994 | Barth | |
| 5,330,234 | A * | 7/1994 | Sweeny | 285/62 |
| 5,476,292 | A | 12/1995 | Harper | |
| 5,553,901 | A | 9/1996 | Serot | |
| 5,580,105 | A | 12/1996 | Miller | |
| 5,593,186 | A | 1/1997 | Harris | |
| 5,628,343 | A | 5/1997 | Lan | |
| 5,743,570 | A * | 4/1998 | Garland | 285/8 |
| 5,779,284 | A | 7/1998 | Guest | |
| 5,813,706 | A | 9/1998 | Travis | |
| 5,921,586 | A | 7/1999 | Prassas | |
| 5,954,372 | A | 9/1999 | Moynihan | |
| 6,027,125 | A | 2/2000 | Guest | |
| 6,050,987 | A | 4/2000 | Rosenbaum | |
| 6,106,029 | A | 8/2000 | DeMore | |
| 6,199,920 | B1 | 3/2001 | Neustadtl | |
| 6,231,090 | B1 | 5/2001 | Fukao et al. | |
| 6,250,603 | B1 | 6/2001 | Knowles et al. | |
| 6,276,727 | B1 | 8/2001 | Schlicht | |
| 6,302,451 | B1 | 10/2001 | Olson | |
| 6,314,985 | B1 | 11/2001 | van der Blom | |
| 6,325,423 | B1 | 12/2001 | Guggemos | |
| 6,378,915 | B1 | 4/2002 | Katz | |
| 6,454,314 | B1 | 9/2002 | Grosspietsch et al. | |
| 6,464,266 | B1 | 10/2002 | O'Neill | |
| 6,471,249 | B1 | 10/2002 | Lewis | |
| 6,517,124 | B1 | 2/2003 | Le Quere | |
| 6,663,111 | B1 * | 12/2003 | Freiseisen et al. | 277/602 |
| 6,722,702 | B1 | 4/2004 | Min-Cheol | |
| 6,832,790 | B2 | 12/2004 | Olson | |
| 6,843,514 | B2 | 1/2005 | Rex et al. | |
| 6,845,784 | B2 * | 1/2005 | Pascznk | 137/312 |
| 6,913,292 | B2 | 7/2005 | Snyder et al. | |
| 6,923,783 | B2 * | 8/2005 | Pasqualucci | 604/27 |
| 6,988,747 | B2 | 1/2006 | Allen et al. | |
| 7,004,511 | B2 | 2/2006 | Barron et al. | |
| 7,032,933 | B2 * | 4/2006 | Hellman | 285/105 |
| 7,270,351 | B2 | 9/2007 | Chelchowski et al. | |
| 7,559,918 | B2 * | 7/2009 | Pasqualucci | 604/164.02 |
| 2003/0090105 | A1 | 5/2003 | Bartholoma et al. | |
| 2004/0240940 | A1 | 12/2004 | Ericksen et al. | |
| 2005/0285395 | A1 | 12/2005 | Feith | |
| 2005/0285400 | A1 | 12/2005 | Feith | |
| 2007/0096464 | A1 | 5/2007 | Spadotto | |

OTHER PUBLICATIONS

SSP website, Duolok page, date unknown, products.sspfittings.com/BrandHome.aspx?Brand=39 (1 page).

SSP website, Duolok fittings page, date unknown, http://products.sspfittings.com/VisualIndex.aspx?Brand=39 (5 pages).

SSP website, Duolok component page, date unknown, http://products.sspfittings.com/VisualIndex.aspx?Brand=39&Family=79 (1 page).

SSP website, Unilok page, date unknown, products.sspfittings.com/BrandHome.aspx?Brand=40 (1 page).

SSP website, Unilok fittings page, date unknown, products.sspfittings.com/VisualIndex.aspx?Brand=40 (4 pages).

SSP website, Unilok component page, date unknown, products.sspfittings.com/VisualIndex.aspx?Brand=40&Family=89 (1 page).

SSP website, Griplok page, date unknown, products.sspfittings.com/BrandHome.aspx?Brand=41 (1 page).

SSP website, Griplok component page, date unknown, products.sspfittings.com/VisualIndex.aspx?Brand=41&Family=99 (1 page).

SSP website, Flolok page, date unknown, products.sspfittings.com/BrandHome.aspx?Brand=43 (1 page).

SSP website, Soft-Seal page, date unknown, products.sspfittings.com/BrandHome.aspx?Brand=28 (1 page).

SSP website, TruFit Adapters page, date unknown, products.sspfittings.com/VisualIndex.aspx?Brand=42&Family=147 (1 page).

SSP website, UltraFlare page, date unknown, products.sspfittings.com/BrandHome.aspx?Brand=5 (1 page).

PlumbingSupply.com website, Brass Compression Fittings page, date unknown, www.plumbingsupply.com/compress.html (9 pages).

Wolfstone website, Compression Fittings page, date unknown, 4 pages, wolfstone.halloweenhost.com/Plumbing/concom_CompressionFittings.html.

SSP website, Koncentrik page, date unknown, products.sspfittings.com/BrandHome.aspx?Brand=38 (1 page).

Fastfittings website, Plastic Fittings page, date unknown, www.fastfittings.com/plastic-fittings (2 pages).

Watts website, Double Compression Coupling page, date unknown, www.watts.com/pro/_products_sub.asp?catId=68&parCat=831 (2 pages).

PlumbingSupply.com website, Shark Bite page, date unknown, www.plumbingsupply.com/shark-bite-fittings.html (11 pages).

Alibaba website, Taizhou Seko Plastic Co. page, date unknown, xigao.en.alibaba.com/productshowimg/218829885-200520273/Coupling.html (2 pages).

Swagelok website, Tube Fitting Types page, date unknown, www.swagelok.com/fittings/tube_fittings/tube_fitting_types.htm (2 pages).

Valco Instruments Co. Inc. website, Reducing ferrules page, date unknown, www.vivi.com/vfit/rf_intro.php (1 page).

Swagelok Catalog, Oct. 2008, U.S.A., 62 pages, entire document.

Alibaba website, "wrap pipe, wrap pipe Manufacturers and Suppliers" page, date unknown, www.alibaba.com/showroom/wrap_pipe.html (6 pages).

Belview website, "About Belview" page, date unknown,www.belviewfire.co.uk/pipe-wraps.html (1 page).

World's Largest Harware Store website, "Fiberglass pipe wrap insulation" page, date unknown, doitbest.com/Pipe+insulation-Wrap-On-model-16509-doitbest-sku-534933.dib.

Integument website, "Integument: Pipe Tapes and Wraps" page date unknown, www.integument.com/pipe.html (1 page).

Wrap-On website, "Pipe Heating Cable" page, date unknown, http://www.elkhartproducts.com/top-products.cfm (3 pages).

Innovative Insulation website, "Pipe Wrap Applications" page, date unknown, www..radiantbarrier.com/pipe-wraps.htm (2 pages).

Pipe Wrap website, "Pipe Wrap Products" page, date unknown, pipewrap.co.uk/below.htm (3 pages, see pp. 1-2).

Pipe Wrap website, "Pipe Wrap Products" page, date unknown, pipewrap.co.uk/specification.htm (1 page).

Pipe Wrap website, "Pipe Wrap Products" page, date unknown, pipewrap.co.uk/application.htm (2 pages).

Epoxy Products website, "Water-Activated Pipe-Wrap" page, date unknown, www.epoxyproducts.com/pipewrap2.html (6 pages).

Bio-Chem Fluidics website, Fittings Systems page, date unknown, http://www.biochemfluidics.com/fittings.html.

Bio-Chem Fluidics website, Connectors and Adapters page, date unknown, http://www.biochemfluidics.com/productline.asp?id=14.

Bio-Chem Fluidics, Omni-Fit Adaptors & Couplings catalog, date unknown, pp. 1-4.

Bio-Chem Fluidics, Omni-Fit Connectors & Connectors with Valves catalog, date unknown, pp. 1-8.

Elkhart Products Corporation website, Products and Services page, date Unknown, http://www.elkhartproducts.com/top-products.cfm.

* cited by examiner

VARIABLE JOINING DEVICE AND METHOD FOR ITS USE

BACKGROUND

The present invention generally relates to a device that may be used to permanently or removably connect a duct (such as a length of pipe or tubing or a container spout) to an object (such as a pipe fitting, a piece of equipment, a tank or other container, or another duct), as well as methods of using the device. More specifically, the device may be used to connect ducts having different sizes and characteristics to the object. In a preferred embodiment, the device acts as a coupling apparatus to connect pipes or tubing having a range of diameters and thread styles to a given object. For example, a single device may be used to join an object to a standard garden hose, a ¾" nominal diameter steel pipe having NPT threads, or a 1" Type L copper pipe.

It is to be noted that the device of the present invention is not limited to use with lengths of pipe and tubing alone. It may also be used with other types of ducts, such as conduit, tubing (including medical or food grade tubing), pipeline, hose, channel, vent, a container spout, or other similar ducts or combinations of such ducts, including those having different cross-sectional shapes (such as square or hexagonal). It is also to be noted that the device of the present invention may be used for ducts transporting gases or liquids or both, so that references to a "fluid" herein are intended to refer to both gases and liquids. In various embodiments, the device may also be used to connect one or more ducts to one or more objects.

Apparatus currently exist in the relevant art that are used to connect lengths of pipe and tubing together. For example, copper pipelines often utilize copper fittings, such as standard couplings, tees and elbows, to connect lengths of copper pipe together. Typically, neither the lengths of pipe nor the fittings have threads. Instead, the fittings have openings therein that are designed so that the entire circumference around the end portion of the pipe is held snuggly against the interior surfaces of the opening in the fitting. The end of the pipe is inserted into the opening in the fitting, and a flux/solder (such as lead-based solder) combination or solder (such as silver solder) is used to create a fluid-tight seal between the fitting and the length of pipe. Plastic pipelines, such as those constructed of polyvinyl chloride (PVC), often utilize plastic fittings that are not threaded and function in a manner similar to the copper fittings. In these cases, the end of the length of plastic pipe is inserted into the opening in the fitting, and the pipe is held snuggly against the interior surfaces of the opening in the fitting. A fluid-tight seal is created by using a primer/PVC glue combination on the interfacing surfaces of the pipe and fitting. Some pipelines, such as those constructed of steel, brass, and sometimes plastic, typically utilize fittings, such as couplings, tees and elbows, in which the lengths of pipe have a threaded end and the fittings have a corresponding threaded opening. In these cases, the threaded ends of the pipes are screwed into the threaded openings in the fittings. The fluid-tight seal between the end of the length of pipe and the fitting may be created by the fit of the threads themselves, or by use of a sealing compound in conjunction with the threads.

As yet another example, some coupling devices utilize a compression-type means. In these devices, a gasket or ring (typically of rubber, plastic or metal) may be positioned on a portion of the length of pipe at or near the end thereof, the end of the pipe is inserted into the coupling, and the coupling has a means to compress the gasket or ring against the end or outside surface of the pipe to form a fluid-tight seal and to hold the pipe in position relative to the coupling device. Still other devices may utilize grooves that are cut into the outside surface of the length of pipe and corresponding fittings that fit into the grooves to form a fluid-tight seal and hold the pipe in position relative to the coupling device.

In each of the coupling devices described above, however, the fittings are generally designed to be used with ducts having limited characteristics. For example, a ¾" black steel tee having NPT threaded openings can only be used with ¾" nominal diameter pipe having NPT threads on the end of the pipe to be connected to the tee. This tee cannot be directly used with 1" Type L copper pipe. Nor can the ¾" nominal diameter pipe be used with a standard garden hose because the NPT threads on the end of the pipe do not match the threads in the end opening of the garden hose. As another example, a ½" copper coupling can only be used with ½" nominal diameter copper pipe. The coupling cannot be directly used with ½" PVC pipe.

There are, however, instances where it may be desirable to connect ducts (such as lengths of pipe or tubing) to objects (such as equipment or containers or other ducts), but a single conventional coupling device is not available to make the desired connection. For example, a person may desire to connect a standard garden hose to a ¾" PVC pipe, but a conventional adapting connector is not available. In such cases, the means to make the connection may be inconvenient, difficult, or sometimes even impossible to obtain under the circumstances. Thus, there is a need for a single device that may be used to connect ducts having a variety of different sizes and characteristics (such as thread type and style) to a given object, such as an item of equipment, a tank or container, or a length of pipe or tubing. A device of this type may be used as a variable joint to make a fluid-tight connection as part of a variety of different types of conventional connecting devices (such as those described above) and a variety of different types and sizes of ducts. In addition, a device of this type may reduce the expense required to make such connections because only one device, as opposed to a combination of conventional coupling devices, is necessary to make the connection. Further, because of the flexibility in use of the device, it may be possible to reduce the number of fittings that need to be maintained in inventory because one device may be used for a number of different connection types that would otherwise require multiple conventional coupling devices. For example, a plumber may need to carry only a few of the devices of the present invention on his or her service vehicle, as opposed to a multitude of different types of conventional coupling devices. Further still, when incorporated as part of an item of equipment, the device may enable a multitude of different sizes and types of ducts to be connected to the item of equipment, as opposed to a conventional coupling device that requires use of a specific type and size of duct. Thus, only a single variable joining device, as opposed to multiple conventional coupling devices, would be required for an item of equipment intended for distribution to countries using metric sizes of ducts, as well as countries using ducts having English units of measurement.

SUMMARY

The present invention is directed to a variable joining device and methods of using the device that meet the needs discussed above in the Background section. As described in greater detail below, the present invention, when used for its intended purposes, has many advantages over other devices known in the art, as well as novel features that result in a new variable joining device and methods for its use that are not anticipated, rendered obvious, suggested, or even implied by any prior art devices or methods, either alone or in any combination thereof.

In a preferred embodiment of the present invention, a device is disclosed that is comprised of a casing member and variable connecting means, which are described in more detail below. In this embodiment, the variable connecting means are generally comprised of a hollow sealing member that has a hyperboloid shape smoothly narrowing from a wider seal inlet opening to a narrower tubular portion having a narrower seal outlet opening. The sealing member is positioned within the casing member, with the perimeter of the wider seal inlet opening being connected to the casing member using internal member connecting means (which are described in more detail below). Preferably, a portion of the sealing member may be generally comprised of an elastic material, such as rubber or synthetic rubber, which allows it to stretch. In this embodiment, internal support means (which are also described in more detail below) may be embedded within the sealing member or positioned between the sealing member and the casing member or both. The internal support means allow the sealing member to expand radially to accommodate different sizes and shapes of ducts, but support the sealing member and the duct in a manner that prevents the sealing member from collapsing longitudinally (along the length of the duct) when thrust loads, if any, are applied to the device and the duct that tend to pull the duct from the device. In various embodiments, the internal support means (described in more detail below) may be further comprised of all or any combination of seal support members that are a part of the sealing member, a cover plate, or a support assembly that may be comprised of rigid or semi-rigid (or both) support members, foam support members, or compressible inserts. The casing member is also preferably connected to an object having an interior space using object connecting means, which are described in more detail below, so that the interior space of the duct is in fluid communication with the interior space of the object when both are joined to the device.

As a duct is inserted into the device of this embodiment, the duct is also inserted into the wider seal inlet opening of the sealing member. As the pipe is advanced further into the sealing member, a portion of the interior surface of the sealing member expands radially to fit tightly against the exterior surface of the duct at the end of the duct. Preferably, this tight fit creates a fluid-tight seal between a portion of the interior surface of the sealing member and the duct. If not, supplemental sealing means (which are described in more detail below), such as an adhesive, may be used to provide or enhance this seal. The device can therefore accommodate a variety of sizes and shapes of ducts within a predetermined range. When the duct is inserted into the device, the internal support means (described in more detail below) hold the pipe and sealing member operatively in place within the casing member. As fluid flows unobstructed from the duct to the object (or vice versa) through the device, there are minimal thrust loads tending to pull the device and the duct apart. Pressure may, however, increase within the device if the fluid flow slows through the device, as may be the case when a valve is closed. The increasing pressure causes thrust loads on the duct and the device to increase, tending to pull the duct from the device along the longitudinal axis of the duct. This increasing pressure also exerts a force against the exterior surface of the sealing member, so that the interior surface of the sealing member is forced against the exterior surface of the duct, enhancing the fluid-tightness of the seal and tending to hold the duct in place relative to the sealing member. The internal support means (described in more detail below) also assist in operatively holding both the sealing member and the duct in place relative to the casing member against the thrust loads. In "operatively" holding in place the sealing member and the duct, it is anticipated that the sealing member and the duct may change position somewhat relative to one another and the casing member, but not in an amount great enough to cause failure of the device within its designed operating parameters.

As may be noted from the preceding summary of a preferred embodiment of the present invention, and the following general summary and detailed description, the device of the present invention meets the needs discussed above in the Background section. For example, the device may be used to connect one or more objects to one or more ducts having various sizes and end characteristics (such as threads) within a predetermined range, as described in more detail below. Thus, the device of the present invention provides all of the functions desired in a single device.

Now turning to a more general summary of the present invention, one embodiment of the present invention generally discloses a device adapted to be connected to at least one duct. The at least one duct has a duct interior space and is comprised of an open end adjoining the duct interior space and a duct exterior surface adjacent to the duct open end. The size and shape of the duct open end and the duct exterior surface are within a predetermined range. The duct open end is adapted to be inserted into the device. In this embodiment, the device is generally comprised of a hollow sealing member and a plurality of seal support members. The sealing member has a wider seal inlet opening and a narrower seal outlet opening. It is further comprised of an interior surface and an opposing exterior surface, each being bounded by the wider seal inlet opening and the narrower seal outlet opening. The wider seal inlet opening is adapted to receive the duct open end when the duct is inserted into the device. A portion of the sealing member is elastically expandable, so that a portion of the interior surface of the sealing member is adapted to expand to conform to the shape of and be positioned adjacent to the duct exterior surface while the at least one duct is inserted into the device. In addition, the sealing member may have any of the characteristics, features, structure and functions described in more detail elsewhere herein. The seal support members extend along a portion of the sealing member between the wider seal inlet opening and the narrower seal outlet opening of the sealing member. The seal support members permit the expansion of a portion of the interior surface of the sealing member to conform to the shape of and to be positioned adjacent to the duct exterior surface, while also being adapted to prevent the collapse of the sealing member in the longitudinal direction of the duct when a force is applied between the duct and the device longitudinally along the duct, such force tending to pull the duct from the device.

Another embodiment of the present invention also generally discloses a device adapted to be connected to at least one duct. In this embodiment, the device comprises a hollow sealing member and a support assembly. The sealing member may be similar to the sealing member generally described above (with or without the seal support members) and may have any of the characteristics, features, structure and functions described in more detail elsewhere herein. The support assembly is adapted to hold the device and the duct operatively in place relative to one another while the duct is inserted into the device. In this embodiment, the support assembly is comprised of a rigid inlet perimeter support member and a plurality of support members, all of which are described in more detail below. The support members permit the expansion of a portion of the interior surface of the sealing member to conform to the shape of and to be positioned adjacent to the duct exterior surface, but hold the device and the duct operatively in place relative to one another while the duct is inserted into the device.

Another embodiment of the present invention also generally discloses a device adapted to be connected to at least one duct. This device also comprises a hollow sealing member and a support assembly. The sealing member may be similar to the sealing member generally described above (with or without the seal support members) and may have any of the characteristics, features, structure and functions described in more detail elsewhere herein. The support assembly is adapted to hold the device and the duct operatively in place relative to one another while the duct is inserted into the device. In this embodiment, the support assembly may be comprised of a rigid inlet perimeter support member, a plurality of rigid or semi-rigid longitudinal support members, a rigid or semi-rigid outlet perimeter support member, and a plurality of support members, all as described in more detail below. In some embodiments, the device may further comprise a casing member having a casing interior space and at least one casing duct opening adjoining the casing interior space. The sealing member and the support assembly are positioned approximately within the at least one casing duct opening and extend into the casing interior space.

Yet another embodiment of the present invention generally discloses a device for connecting to at least one duct. This device is comprised of a casing member and variable connecting means, which are described in more detail below, for connecting the duct to the device. The casing member has a casing interior space and at least one casing duct opening adjoining the casing interior space. The casing duct opening is of a size and shape adapted to receive the duct open end. The variable connecting means (described in more detail below) are positioned approximately within the casing duct opening and extend into the casing interior space. The variable connecting means (described in more detail below) are further comprised of a hollow sealing member, which may have any of the characteristics, features, structure and functions described in more detail elsewhere herein. The variable connecting means hold the duct operatively in place relative to the device when the duct is inserted into the device. In some embodiments, the variable connecting means (described in more detail below) may be further comprised of a support assembly, a portion of which is deformed radially away from the duct as the duct is inserted into the device, but provides a force radially inward toward the duct exterior surface while the duct is inserted into the device, all as described in more detail below.

Still another embodiment of the present invention also generally discloses a device for connecting to at least one duct. This device is comprised of a casing member and an internal member. The casing member may have any of the characteristics, features, structure and functions described in more detail elsewhere herein. The internal member is positioned approximately within at least one casing duct opening and extends into a casing interior space. The internal member is further comprised of a hollow sealing member, internal support means, and internal member connecting means, both of which are described in more detail below. The sealing member may have any of the characteristics, features, structure and functions described in more detail elsewhere herein. The internal support means (described in more detail below) are adapted for holding the device and the duct operatively in place relative to one another while the duct is inserted into the device. The internal member connecting means (described in more detail below) are for connecting the internal member to the casing member, so that a fluid tight seal is created between the internal member and the casing member. In some embodiments, the internal support means (described in more detail below) may further comprise a plurality of rigid or semi-rigid support members positioned adjacent to the sealing member or the casing member or any combination thereof and extending therefrom into the proximity of the sealing member. The support members may further comprise a plurality of rigid duct end support members, which are positioned so that the duct open end abuts against the duct end support members upon the duct being inserted into the device a predetermined distance, so that the duct end support members are adapted to act as a stop, limiting the travel of the at least one duct into the device. In other embodiments, the casing member may further comprise object connecting means (described in more detail below) adapted for connecting at least one object to the casing member. In these embodiments, the object has an object interior space and is comprised of an object open end adjoining the object interior space. The interior space of the duct and the interior space of the object are both in fluid-communication with a chamber bounded by the exterior surface of the sealing member and the interior surface of the casing member adjacent to the casing interior space while the duct is inserted into the device.

Another embodiment of the present invention also generally discloses a device for connecting to at least one duct. This device is comprised of a case body, at least one case cap, case cap connecting means (described in more detail below), and an internal member. The case body has a casing interior space and at least one case body open end. The case cap has a casing duct opening of a size and shape adapted to receive the duct open end. The case cap connecting means (described in more detail below) are for connecting the case cap to the case body at the case body open end, so that the casing duct opening is adjoining the casing interior space. The internal member is positioned approximately within the case body open end and extends into the casing interior space. The internal member is further comprised of a hollow sealing member, a support assembly, and internal member connecting means (described in more detail below) for connecting the internal member to the casing member. The sealing member may have any of the characteristics, features, structure and functions described in more detail elsewhere herein. The support assembly is positioned in the interior space of the casing member between the sealing member and the casing member, and is adapted to hold the device and the duct operatively in place relative to one another while the duct is inserted into the device.

Another embodiment of the present invention generally discloses a device for connecting at least one duct to at least one object. This device is comprised of a casing member, object connecting means, and variable connecting means, both of which are described in more detail below. The casing member may have any of the characteristics, features, structure and functions described in more detail elsewhere herein. The object connecting means (described in more detail below) connect the object to the casing member. In this embodiment, the object has an object interior space and is comprised of an object open end adjoining the object interior space. The interior space of the duct and the interior space of the object are both in fluid-communication with a chamber bounded by the exterior surface of the sealing member and the interior surface of the casing member adjacent to the casing interior space while the duct is inserted into the device. The variable connecting means (described in more detail below) are adapted for connecting to the duct and are positioned approximately within the casing duct opening, extending into the casing interior space. The variable connecting means (described in more detail below) also comprise a sealing member, which may have any of the characteristics, features, structure and functions described in more detail elsewhere herein. In some embodiments, the device may further comprise the at least one object or the at least one duct or any combination thereof.

There has thus been outlined, rather broadly, the more primary features of the present invention. There are additional features that are also included in the various embodiments of the invention that are described hereinafter and that form the subject matter of the claims appended hereto. In this respect, it is to be understood that the invention is not limited in its application to the details of construction and to the arrangements of the components set forth in the following description or illustrated in the following drawings. This invention may be embodied in the form illustrated in the accompanying drawings, but the drawings are illustrative only and changes may be made in the specific construction illustrated and described within the scope of the appended claims. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

The foregoing summary, as well as the following description, will be better understood when read in conjunction with the appended drawings, in which.

DETAILED DESCRIPTION

Reference will now be made in detail to the preferred aspects, versions and embodiments of the present invention, examples of which are illustrated in the accompanying drawings. While the invention will be described in conjunction with the preferred aspects, versions and embodiments, it is to be noted that the aspects, versions and embodiments are not intended to limit the invention to those aspects, versions and embodiments. On the contrary, the invention is intended to cover alternatives, modifications, portions and equivalents, which may be included within the spirit and scope of the invention as defined by the appended claims.

Figure 1:
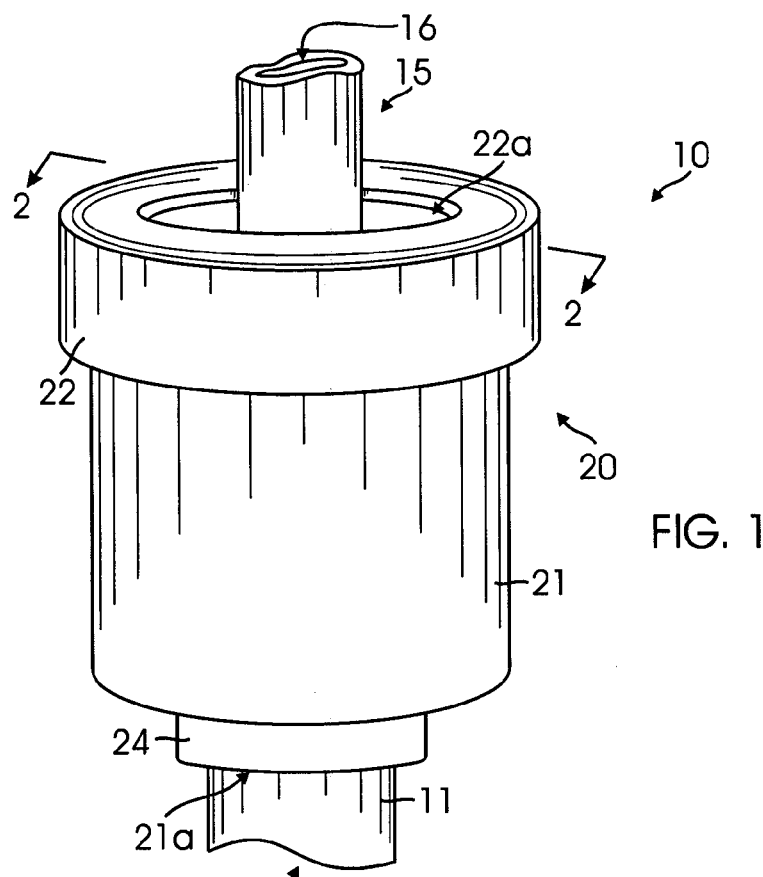
FIG. 1 is a perspective view of an embodiment of a device of the present invention, as viewed from the side of and above the device.
Figure 2:
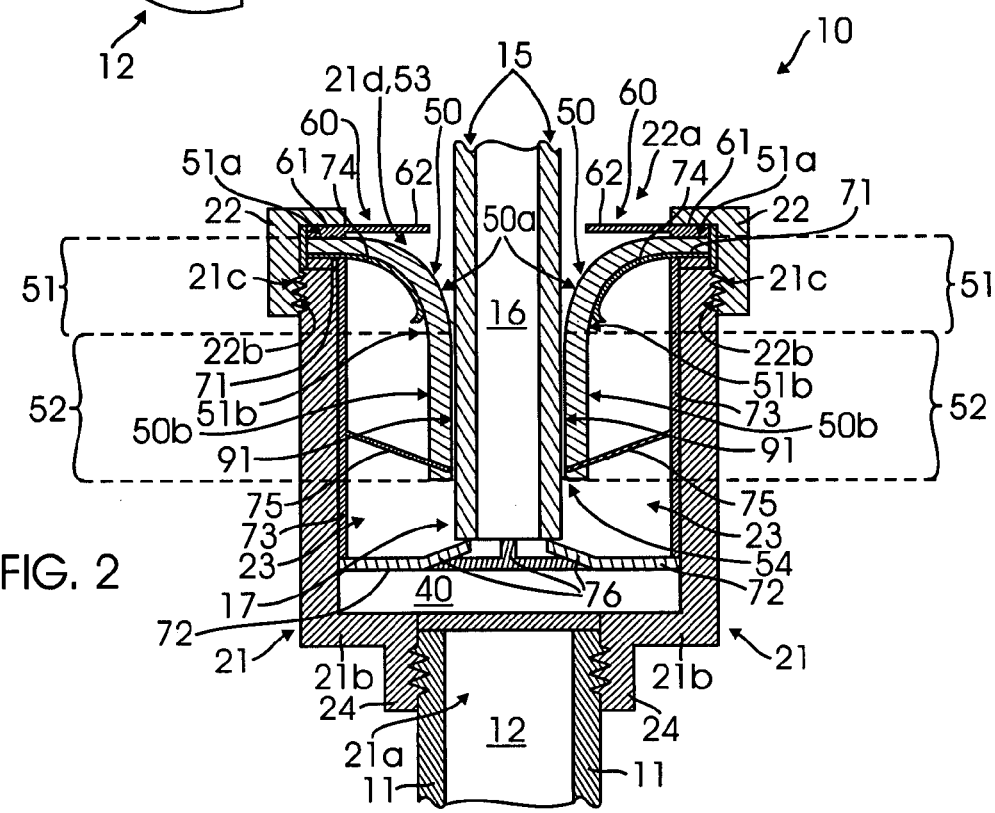
FIG. 2 is a sectional view of the embodiment of the device illustrated in FIG. 1, as taken along the lines 2-2 in FIG. 1.
Figure 3A:
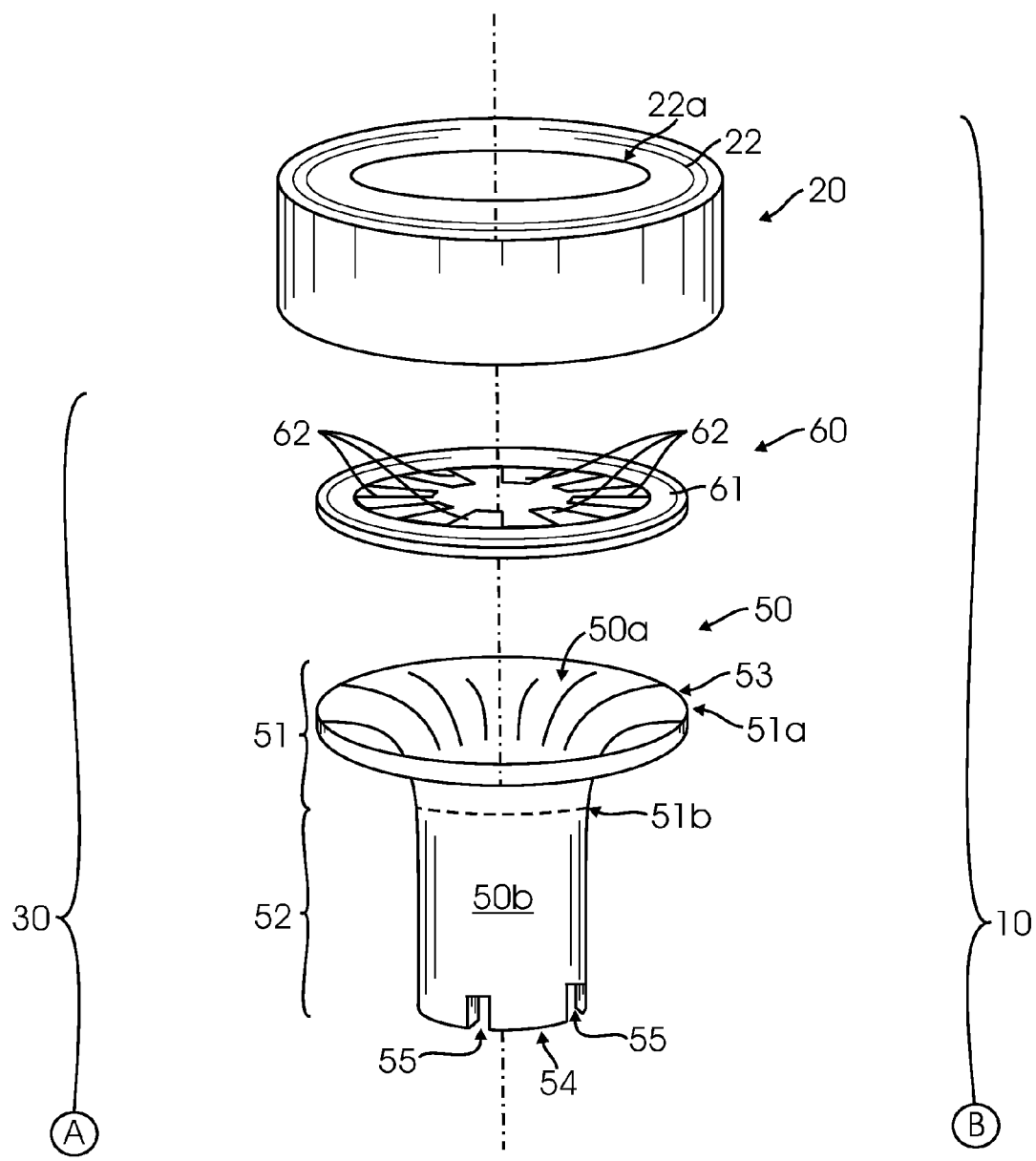
FIG. 3A and FIG. 3B together represent an exploded perspective view of the embodiment of the device illustrated in FIG. 1 and FIG. 2, as viewed from the side of and above the device.
Figure 3B:
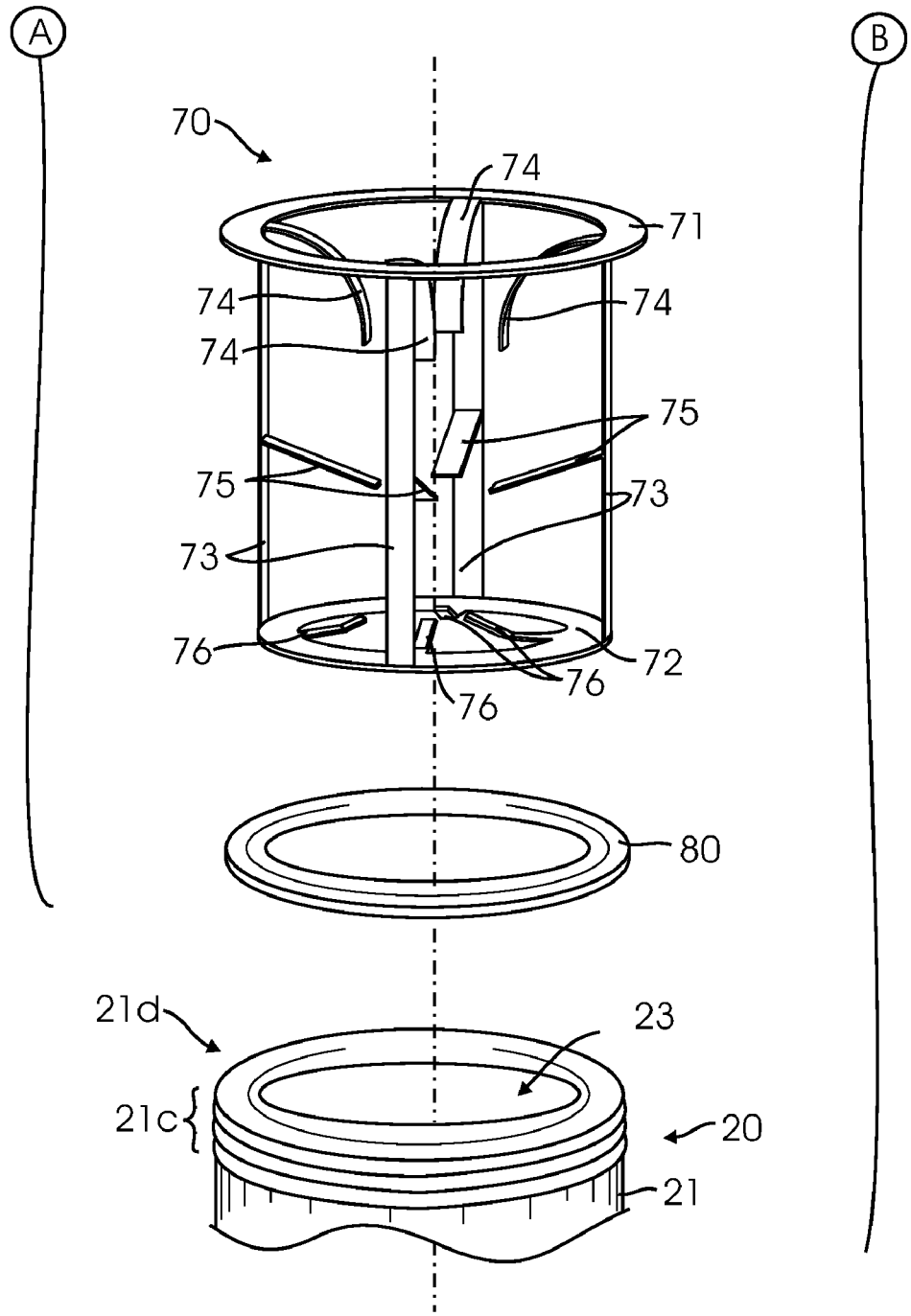

One embodiment of the present invention is illustrated in FIG. 1, FIG. 2, FIG. 3A and FIG. 3B. FIG. 2 presents a sectional view of the device 10 illustrated in FIG. 1, which serves to illustrate the interior components and operation of the device 10. FIG. 3A and FIG. 3B present an exploded perspective view of the device 10 illustrated in FIG. 1 and FIG. 2. The device 10 may be used for connecting an object (such as the pipe 11 illustrated in FIG. 1 and FIG. 2, but not illustrated in FIG. 3A or FIG. 3B) having an interior space 12 to a duct (also a pipe 15 in the embodiment illustrated in FIG. 1 and FIG. 2, but not illustrated in FIG. 3A or FIG. 3B) having an interior space 16. In some embodiments, the device 10 may be further comprised of the duct (pipe 15). In other embodiments, the device 10 may be further comprised of the object (pipe 11), as described in more detail below. A particular advantage of the present invention is that one device 10 may be used to connect ducts (such as pipe 15) having different sizes and features to an object (such as pipe 11), as described in more detail below. Thus, as illustrated in FIG. 1 and FIG. 2, the device 10 may be used to connect an object (such as pipe 11) to ducts (such as pipe 15) having different diameters and thread styles on the end 17 thereof. For example, in some embodiments, one device 10 may be suitable for connecting the object (pipe 11) to a typical garden hose with a standard hose thread on one end 17, to a ¾" PVC pipe having NPT threads on one end 17, to a ¾" PVC pipe having no threads on its end 17, or to a 1" Type L copper pipe with no threads on its end 17.

Although the illustrated duct (pipe 15) has a tubular shape without a threaded end 17, in other embodiments the duct 15 may be comprised in whole or in part of conduit, tubing (including medical or food grade tubing), pipeline, duct, hose, channel, vent or other similar objects or combinations of such objects that may be currently known in the relevant art or that may be developed in the relevant art in the future. The duct (pipe 15) may also comprise a spout or other outlet or inlet member of a bottle, canister, can, cask, box, bag, carton, carafe, hopper, pouch, package, packet, sack, vial, flask, jar, jug, tank, vat, vessel or other container. Such spout or other outlet or inlet member may or may not comprise a threaded or another connecting means. The duct (pipe 15) may also have other shapes in other embodiments. For example, the duct (pipe 15) may have a cross-section that is approximately elliptical, triangular, square, rectangular, pentagonal, hexagonal, another polygonal shape, or another shape or combination of such shapes. Further, the duct (pipe 15) may have a variety of different thread types on the end 17 of the pipe 15. For example, the threaded end 17 may have American Standard Pipe Taper Threads (NPT), American Standard Straight Coupling Pipe Threads (NPSC), American Standard Taper Railing Pipe Threads (NPTR), American Standard Straight Mechanical Pipe Threads (NPSM), American Standard Straight Locknut Pipe Threads (NPSL), American Standard Pipe Taper Threads (Dryseal; NPTF), American Fuel Internal Straight Pipe Thread (NPSF), British Standard Pipe Threads (tapered—BSPT, and parallel—BSPP), or any other type of threads. Alternatively, the duct (pipe 15) may have no threads or a different type of connector means (such as a VICTAULIC® groove) on the end (pipe end 17) thereof. The duct (pipe 15) may also be comprised of any materials suitable for constructing conduit, tubing, pipeline, duct, hose, channel, vent or similar objects. Examples include metals (such as steel, steel alloys, aluminum, copper, brass, and other metals and metal alloys), polymers (such as polyvinyl chloride, polyethylene, acrylonitrile butadiene styrene (ABS), rubber, synthetic rubber (including NEOPRENE), silicon, and other polymers), wood, glass, fiberglass, carbon-based and other composites, or other materials or a combination of such materials. It is also to be noted that the device 10 of the present invention may be used for ducts (pipe 15) transporting gases or liquids or both, so that references to a "fluid" herein are intended to refer to both gases and liquids. In various embodiments, the device 10 may also be used to connect one or more ducts (pipe 15) to one or more objects (such as pipe 11), as described in more detail below. It is to be noted that the device 10 of the present invention may also be used to connect to solid objects instead of ducts (pipe 15) designed to carry fluids, where such objects have any of the exterior characteristics of the ducts (pipe 15) described herein (such as rods), and where it may be desired to have a device 10 for holding such object in place relative to the device 10 against forces that tend to pull the object from the device longitudinally along the object.

In various embodiments of the present invention, the object (pipe 11) may have any of the structures, features or characteristics of the duct (pipe 15) described above. In addition, the object (pipe 11) may also be comprised in whole or in part of equipment, machinery, containers, tanks, or other objects or a combination of such objects to which it may be desirable to connect one or more ducts (such as pipe 15) in a manner that provides for fluid communication between the interior space 12 of the object (pipe 11) with the interior space 16 of the duct (pipe 15), as described in more detail below. This connection may also provide a fluid-tight seal between the duct (pipe 15) and the object (pipe 11). It is to be noted that references herein to the pipe 15 and the pipe 11 may also be deemed to refer to any of the other types of ducts or objects, respectively, described herein with respect to the various embodiments of the present invention.

In the embodiment of the present invention illustrated in FIG. 1 through FIG. 3B, the device 10 is generally comprised of a casing member 20, variable connecting means (internal member 30 in this embodiment) and object connecting means, all of which are described in more detail below. In the illustrated embodiment of the device 10, the casing member 20 is further comprised of a hollow, approximately tubular-shaped case body 21 and a case cap 22 positioned at one end of the case body 21. The case cap 22 has a duct opening 22a positioned therein that is of a size and shape adapted to receive the duct (pipe 15). The case cap 22 may be removably or permanently connected to the case body 21 by case cap connecting means, which are described in more detail below. Although the case body 21 is approximately tubular-shaped in the illustrated embodiment, the casing member 20 may have other shapes in other embodiments of the device 10, as long as the casing member 20 has an interior space 23 and a duct opening 22a and an object opening 21a (in some embodiments) each adjoining the interior space 23, wherein the duct opening 22a is of a size and shape adapted to receive the duct (pipe 15) and the object opening 21a is of a size and shape adapted to be connected to the object (pipe 11) using the object connecting means (which are described in more detail below). As an example of an alternate shape, all or a portion of the case body 21 may be hexagonal in shape when viewed from above an end of the case body 21. This shape may assist the user of the device 10 in holding the case body 21 with a pipe wrench, adjustable wrench, or other tool in operation of the device 10. As other examples, the case body 21 may be approximately elliptical, triangular, square, rectangular, pentagonal, another polygonal shape, other shapes having arcuate or linear portions, or another shape or combination of such shapes, as long as the casing member 20 cooperates with the internal member 30 in operation of the device 10, and adequately provides for connection to the object (pipe 11), all as described in more detail below.

The preferred size and shape of the case body 21 are dependent upon a number of factors, such as the anticipated size or range of sizes of the duct (pipe 15), the size of the object (pipe 11), the size, shape and configuration of the internal member 30, the anticipated operating pressures of the device 10 (i.e., the pressures expected in the chamber 40, as described in more detail below), the materials comprising the case body 21, the type of internal member connecting means and object connecting means (both described in more detail below) utilized in the device 10, the preferences of the user of the device 10, and other factors. The preferred wall thickness of the case body 21 is generally dependent upon the same types of factors. In addition, the case body 21 may be comprised of any suitable type of material. For example, the case body 21 may be comprised of metal (such as steel, steel alloys, aluminum, copper, brass, and other metals and metal alloys), polymers (such as polyvinyl chloride, polyethylene, polypropylene, ABS, and other polymers), wood, fiberglass, carbon-based or other composites, or other materials or a combination of such materials. The preferred material is dependent upon a number of different factors, such as the anticipated size or range of sizes of the duct (pipe 15), the size of the object (pipe 11), the type of connection to be made to the object (pipe 11), the size, shape and configuration of the internal member 30, the anticipated operating pressures of the device 10 (i.e., the pressures expected in the chamber 40, as described in more detail below), the anticipated operating or installation temperatures of the device 10, the type of fluid carried by the duct (pipe 15) and the object (pipe 11), the desired wall thickness and weight of the case body 21, the type of internal member connecting means (described in more detail below) utilized in the device 10, the preferences of the user of the device 10, and other factors. The case body 21 may be fabricated using any suitable means. For example, a case body 21 constructed of PVC may be formed by injection molding. In the case of a device 10 designed for use with room temperature domestic potable water and capable of accommodating pipe 15 in the range of ¾" to ¼" nominal diameter, the case body 21 is preferably tubular in shape, is constructed of polyvinyl chloride, has an inside diameter of approximately 1½ inches, and has a wall thickness in the range of approximately ⅛ inch to 3/16 inch.

Figure 6:
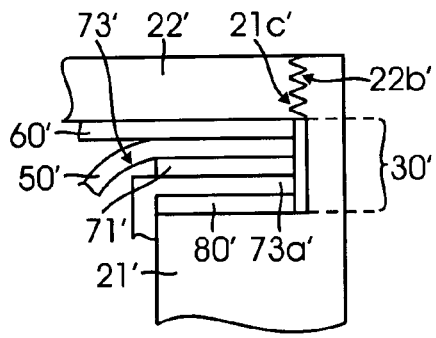
FIG. 6 is an enlarged partial sectional elevation view of another embodiment of the support assembly and another embodiment of the case cap connecting means.

In the embodiment of the device 10 illustrated in FIG. 1 through FIG. 3B, the case cap 22 is approximately cylindrical in shape and may be permanently or removably attached to the open end 21*d* of the case body 21 adjacent to the duct opening 22*a* by the case cap connecting means, which are described in more detail below. In the illustrated embodiment, which is the preferred embodiment, the case cap connecting means are comprised of threads 21*c* on the outside surface of the portion of the case body 21 adjacent to the open end 21*d* of the case body 21 and corresponding threads 22*b* on the interior surface of the tubular portion of the case cap 22. Thus, the case cap 22 may be placed over the open end 21*d* of the case body 21, and may then be screwed down onto the case body 21. In this embodiment, when the case cap 22 is screwed down onto the case body 21, a portion of the internal member 30 is compressed between the case cap 22 and the case body 21, holding the internal member 30 in place relative to the casing member 20 and forming a fluid-tight seal between the internal member 30 and the case body 21, all as described in more detail below and as more particularly illustrated in connection with FIG. 2 and FIG. 3A and FIG. 3B. Another embodiment of a threaded connection between the case cap 22' and the case body 21' is illustrated in FIG. 6. In this embodiment, the threads 21*c'* on the case body 21' are positioned on the interior surface of the case body 21', and the corresponding threads 22*b'* of the case cap 22' are positioned on the exterior surface of a disc-shaped case cap 22'. The case cap 22' is screwed into the case body 21', holding the internal member 30' in place relative to the casing member 20' and forming a fluid-tight seal between the internal member 30' and the case body 21' in a manner similar to that described above.

It is to be noted that in other embodiments the case cap 22 may have a different shape, as long as the case cap 22 cooperates with the case body 21 and the internal member 30 to accommodate the operation of the device 10, as described in more detail herein. For example, the case cap 22 may facilitate the fluid-tight seal between the case body 21 and the internal member 30 in this embodiment, as described in more detail below. In addition, the duct opening 22*a* may be of almost any size and shape, as long as it permits the formation of a fluid-tight seal between the internal member 30 and the case body 21 in this embodiment and permits the casing member 20 to receive the duct (pipe 15), which means that the pipe 15 may be inserted into the casing member 20 and the internal member 30. The case cap 22 may generally be comprised of any materials or combinations of materials that may be used to construct the case body 21, as described in more detail above and illustrated in connection with FIG. 1 through FIG. 3B. Although the case cap 22 need not be constructed of the same material as the case body 21, the case cap 22 is preferably constructed of the same material. The case cap 22 may be fabricated using any suitable manufacturing means. For example, a case cap 22 comprised of PVC may be formed by injection molding.

In addition, the case cap connecting means may be comprised of means other than the illustrated threads 21*c*, 22*b*. For example, other case cap connecting means that may be used to removably connect the case cap 22 to the case body 21 comprise clasps, clamps, clips, pins, hinges, other pivoting connectors or other types of connectors, either alone or in conjunction with one another in different combinations. Examples of case cap connecting means that may be used to permanently connect the case cap 22 to the case body 21 include adhesives, epoxies, welding, fusing, nails, screws, nuts, bolts, or other fasteners or a combination of such means. Where the internal member 30 may be positioned within the interior space 23 of the casing member 20 other than through the open end 21*d* of the case body 21, the case cap 22 may also be fabricated as a part of the case body 21. It is to be noted, however, that the case cap connecting means may or may not be utilized to facilitate a fluid-tight seal between the internal member 30 and the case body 21. In some embodiments, a fluid-tight seal may be inherent in the type of case cap connecting means used (such as welding or fusing), or it may be created in whole or in part by additional sealing means, such as o-rings, gaskets, flanges, washers, or other similar types of means or combinations of such means, as described in more detail below. The preferred characteristics of the case cap 22 and case cap connecting means are dependent upon a number of different factors, such as the anticipated range of shapes and sizes of the duct (pipe 15), the size and type of the object (pipe 11), the size and shape of the internal member 30, the anticipated operating pressures of the device 10 (i.e., the pressures expected in the chamber 40, as described in more detail below), the materials comprising and the shape of the case body 21, the type of internal member connecting means (described in more detail below) utilized in the device 10, the preferences of the user of the device 10, and other factors. More preferred, the case cap 22 is generally of the shape illustrated in FIG. 1 through FIG. 3B and has a threaded case connecting means. A method of constructing the device 10 is also disclosed, the method comprising selecting the case base 21, positioning an internal member 30 approximately within the case body open end 21*d* so that the internal member 30 extends into the casing interior space 23, and connecting the case cap 22 to the case body 21 at the case body open end 21*d* utilizing the case cap connecting means.

Generally, the object (pipe 11) is connected to the casing member 20 by the object connecting means. In the embodiment of the device 10 illustrated in FIG. 1 and FIG. 2, the object connecting means are comprised of a female iron pipe (FIP) adapter 24 fabricated as a part of a case base 21*b* positioned at one end of the case body 21. Thus, in this embodiment, the object opening 21*a* of the case body 21 is positioned in the case base 21b. Also, in this embodiment, the FIP adapter 24 is positioned on the case base 21b so that the longitudinal axis of the FIP adapter 24 passes through the center of the object opening 21a of the case base 21b. In other embodiments, the FIP adapter 24 (or other object connecting means) may be positioned on a different portion of the casing member 20, as long as the position does not adversely affect the operation of the device 10, as described in more detail below. For example, the FIP adapter 24 may be positioned in the case base 21b approximately adjacent to the side wall of the case body 21, rather than approximately in the center of the case base 21b. In addition, the FIP adapter 24 (or other object connecting means) may have a different orientation relative to the casing member 20, as long as the position does not adversely affect the operation of the device 10, as described in more detail below. For example, the FIP adapter 24 may be oriented at a 45 degree angle relative to the case base 21b, rather than at a 90 degree angle relative to the case base 21b, as illustrated in FIG. 1 and FIG. 2. In the illustrated embodiment, the FIP adapter 24 may be fabricated as a part of the case base 21b, which is the preferred means of fabrication, or it may be fabricated separately from the case base 21b and attached to the case base 21b by any suitable means, such as adhesives, epoxies, welding, fusing, nails, screws, clips, clamps, nuts, bolts, or other fasteners or a combination of such means.

It is to be noted that in other embodiments of the present invention, the object connecting means (FIP adapter 24) may be comprised of almost any means that may be used for making a fluid-tight connection. For example, the object connecting means may be comprised of a male iron pipe (MIP) adapter. As other examples, the object connecting means may be comprised of welding, fusing, adhesives, glues, epoxies, a garden hose connector, a connector having any of the thread types (male or female) described above with respect to the threaded end 17 of pipe 15, luer lock fittings, SWAGELOK® fittings, quick connect/disconnect fittings, hose barbs, stepped tubing connectors, bushings, flanges, compression fittings, tubing and hose connectors, SPEEDFIT® connectors, couplings for connection using clamps or adhesives, or other means or a combination of such means. In addition, the object connecting means may be comprised in whole or in part of a segment of conduit, tubing (including medical or food grade tubing), pipeline, duct, hose, channel, vent, a spout or other outlet or inlet member, or other similar objects or a combination of such objects, as described above with respect to pipe 15, extending from a portion of the casing member 20. The preferred object connecting means for use with any particular embodiment of the device 10 depends upon a number of factors, such as the anticipated size or range of sizes of the duct (pipe 15), the size and type of materials comprising the object (pipe 11), the size and type of the internal member 30, the anticipated operating pressures of the device 10 (i.e., the pressures expected in the chamber 40, as described in more detail below), the anticipated operating or installation temperatures of the device 10, the materials comprising and the shape and size of the case member 20, the type of internal member connecting means (described in more detail below) utilized in the device 10, the preferences of the user of the device 10, and other factors. More preferably, for an FIP adapter 24 comprised of PVC that is used to connect a pipe 11, the FIP adapter 24 is positioned and oriented as illustrated in FIG. 1 and FIG. 2 and is fabricated as a part of the case base 21b by injection molding.

Figure 4A:
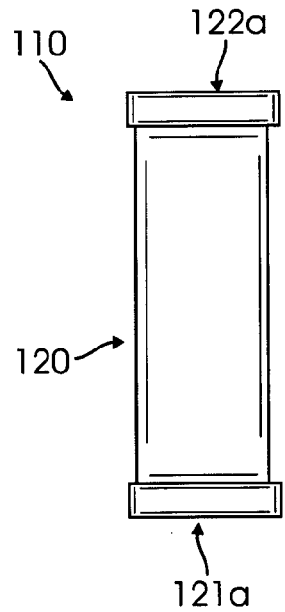
FIG. 4A is a plan view of an embodiment of a device of the present invention, generally comprising a coupling.
Figure 4B:
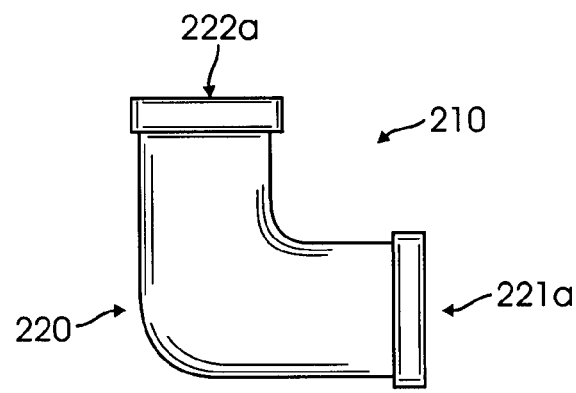
FIG. 4B is a plan view of an embodiment of a device of the present invention generally comprising an elbow.
Figure 4D:
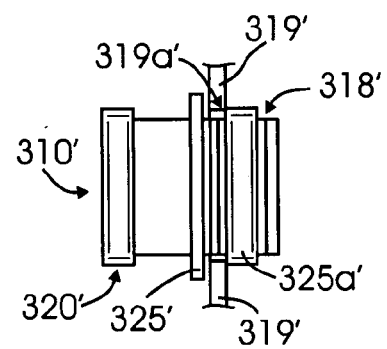
FIG. 4D is a plan view of an embodiment of a device of the present invention generally comprising means to connect the device to equipment, machinery, containers, tanks and other objects.
Figure 4C:
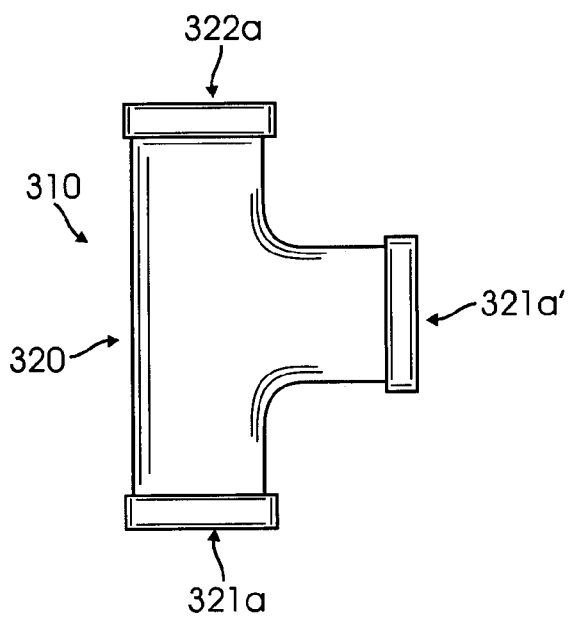
FIG. 4C is a plan view of an embodiment of a device of the present invention generally comprising a tee.

It is to be noted that the casing member 20, the variable connecting means (represented by the internal member 30 in this embodiment) working in conjunction with the casing member 20, and the object connecting means (FIP adapter 24 in the illustrated embodiment) may be incorporated in a variety of ways in any standard types of fittings, which may be fabricated as a part of or be attached to the casing member 20. For example, as illustrated in FIG. 4A, the casing member 120 may be fabricated as a portion of a coupling 110. In the embodiment illustrated in FIG. 4A, variable connecting means are located at the duct opening 122a (that receives the duct, which is not illustrated) and at the object opening 121a (that receives the object, which is not illustrated, but is typically a pipe or tubing in this embodiment), so that variable connecting means are located at each end of the coupling 110. As a result, the object connecting means (as variable connecting means) may be used to accommodate objects (such as pipe and tubing) of various diameters and thread configurations. Alternatively, the object opening 121a and its associated object connecting means may comprise any other type of object connecting means described above and illustrated in connection with FIG. 1 and FIG. 2. As another example, as illustrated in FIG. 4B, the casing member 220 may be fabricated as a portion of a 90 degree elbow 210. In the embodiment illustrated in FIG. 4B, variable connecting means are located at the duct opening 222a (that receives the duct, which is not illustrated) and at the object opening 221a (that receives the object, which is not illustrated, but is typically a pipe or tubing in this embodiment), so that variable connecting means are located at each end of the elbow 210. As a result, the object connecting means (as variable connecting means) may be used to accommodate objects (such as pipe and tubing) of various diameters and thread configurations. Alternatively, the object opening 221a and its associated object connecting means may comprise any other type of object connecting means described above and illustrated in connection with FIG. 1 and FIG. 2. In addition, the bend in the elbow 210 may be more or less than 90 degrees in other embodiments. As yet another example, as illustrated in FIG. 4C, the casing member 320 may be fabricated as a portion of a tee 310. In the embodiment illustrated in FIG. 4C, variable connecting means are located at the duct opening 322a (that receives the duct, which is not illustrated) and at the two object openings 321a, 321a' (that are adapted to receive the objects, which are not illustrated, but are typically pipes or tubing in this embodiment), so that variable connecting means are located at all ends of the tee 310. As a result, the object connecting means (as variable connecting means) at object openings 321a, 321a' may be used to accommodate objects (such as pipes and tubing) of various diameters and thread configurations. Alternatively, each of the object openings 321a, 321a' and its associated object connecting means may comprise any other type or combination of types of object connecting means described above and illustrated in connection with FIG. 1 and FIG. 2. In addition, the variable connecting means of the duct opening 222a and the object connecting means of the object openings 321a, 321a' may each be positioned on any of the ends of the tee 310 in different combinations. The embodiment illustrated in FIG. 4C also serves to illustrate how the present invention may be used to connect a duct to more than one object or an object to more than one duct.

Referring again to FIG. 1 and FIG. 2, the object connecting means may also be used to connect the casing member 20 to the side wall of another pipe, such as may be the case with a sewer line tap. Further, the object connecting means may also be comprised in whole or in part of another variable connecting means (which are described in more detail below) of the present invention. Further still, the object connecting means may be comprised in whole or in part of the object, such as a tank, container, machine or item of equipment or any portion of the same. For example, the object connecting means may be comprised of the case base 21b being a part of or affixed to the side wall of a tank (not illustrated), so that the device 10 connects the duct (pipe 15) to the interior space of the tank (which would comprise the object in this embodiment). As another example, the base case 21b may be a part of or affixed to a panel on a piece of machinery or equipment (not illustrated), so that the device 10 connects the duct (pipe 15) to the portion of the machinery that utilizes fluid supplied by the pipe 15. An embodiment of this type of connection is illustrated in FIG. 4D, in which the object connecting means of the device 310' is comprised of a collar member 325' that extends around the circumference of the casing member 320'. In this embodiment, the equipment panel or the boundary wall of a container 319' has an opening 319a' therein. The device 310' is inserted into the opening in the panel or boundary wall 319' until it abuts up against the collar member 325'. In this embodiment, the panel or boundary wall 319' is held in place against the collar member 325' by a lock nut 325a' that is screwed down on threads 318' positioned on the outside surface of the casing member 320'. In other embodiments, the panel or boundary wall 319' may be held in place against the collar member 325' by any suitable means, such as clasps, clamps, clips, pins, dowels, adhesives, epoxies, welding, fusing, nails, screws, nuts, bolts, flanges or other means or a combination thereof.

As is readily apparent to one skilled in the relevant art, the variable connecting means of the present invention may be used in conjunction with almost any type of fitting or joining or coupling system currently known in the relevant art or that may be developed in the relevant art in the future. All of such fittings and coupling and joining systems incorporating the variable connecting means may be included within the spirit and scope of the invention as defined by the appended claims.

As illustrated in FIG. 2, FIG. 3A and FIG. 3B, the internal member 30 (as an embodiment of the variable connecting means) of the device 10 is positioned within the interior space 23 of the casing member 20. As described in more detail below, the end 17 of the duct 15 is inserted into the device 10, so that the duct 15 extends into the internal member 30 as well. In the illustrated embodiment, the internal member 30 is generally comprised of a sealing member 50, internal support means, internal member connecting means, and supplemental duct sealing means, all of which are described in more detail below. In this embodiment, the sealing member 50 is comprised of an interior surface 50a and an exterior surface 50b. The sealing member is also generally comprised of a seal transitional portion 51 and a seal adhering portion 52. In this embodiment, the seal transitional portion 51 has a wider open end 51a that is sealed to the case body 21 approximately adjacent to the case body open end 21d in the manner described below. The seal transitional portion 51 also has a narrower open end 51b opposite the wider open end 51a that is connected to the seal adhering portion 52. The seal transitional portion 51 is generally constructed at least in part of an elastic material, allowing it to stretch so that its narrower open end 51b conforms to the exterior surface of the duct (pipe 15) adjacent to its end 17 while the duct (pipe 15) is inserted into the internal member 30. The seal adhering portion 52 extends longitudinally away from the narrower open end 51b of the seal transitional portion 51. The seal adhering portion 52 is generally constructed of an elastic material, allowing it to stretch so that its interior surface 50a conforms to the exterior surface of the duct (pipe 15) adjacent to its end 17 while the duct (pipe 15) is inserted into the internal member 30. The interior surface 50a of the seal adhering portion 52 is preferably held tightly against the exterior surface of the duct (pipe 15) for all sizes and shapes of ducts (pipe 15) that may be properly connected to the device 10. Thus, a fluid-tight seal is preferably formed between the seal adhering portion 52 and the exterior surface of the duct (pipe 15), which also preferably helps prevent the duct (pipe 15) from moving relative to the seal adhering portion 52 while the duct (pipe 15) is inserted into the seal adhering portion 52. The supplemental duct sealing means, which are described in more detail below, may be used in some embodiments to provide or enhance the seal between the seal adhering portion 52 and the duct (pipe 15).

In the embodiment of the device 10 illustrated in FIG. 2, FIG. 3A and FIG. 3B, the internal support means are comprised of a cover plate 60 and a support assembly 70. The cover plate 60 is positioned between the sealing member 50 and the case cap 22 of the casing member 20. The features, functions and operation of the cover plate 60 are described in more detail below. The support assembly 70 (as described in more detail below) may be comprised of rigid members, non-rigid members, or a combination of rigid and non-rigid members that serve to hold the duct (pipe 15) and the sealing member 50 operatively in place relative to one another and the casing member 20. An inlet perimeter support member 71 comprising the support assembly 70 is positioned between a washer 80 and the perimeter edge portion of the wider open end 51a of the seal transitional portion 51. In this embodiment, the washer 80 (which comprises a part of the internal member connecting means, as described in more detail below) is positioned between the inlet perimeter support member 71 of the support assembly 70 and the open end 21d of the case body 21. In the illustrated embodiment, as the case cap 22 is screwed down onto the case body 21, the portion of the case cap 22 adjacent to the duct opening 22a is pressed against the perimeter edge portion of the cover plate 60, the perimeter edge portion of the wider open end 51a of the seal transitional portion 51, the inlet perimeter support member 71 of the support assembly 70, and the washer 80. This compression, acting as internal member connecting means (as described in more detail below) to connect the internal member 30 to the casing member 20, also provides a fluid-tight seal between the internal member 30 and the casing member 20, so that a fluid-tight chamber 40 is formed. The chamber 40 is bounded by the exterior surface 50b of the sealing member 50, the internal surfaces of the case body 21 and the FIP adapter 24 (which for chamber 40 purposes are considered to be a part of the case body 21) posterior to the washer 80, and the internal surfaces of the duct (pipe 15) and the object (pipe 11). In other embodiments, which are the preferred embodiments, two or more of the components comprising the internal member 30 may also be joined together using any suitable means. For example, the perimeter edge portion of the cover plate 60, the perimeter edge portion of the wider open end 51a of the seal transitional portion 51, the inlet perimeter support member 71 of the support assembly 70, and the washer 80 may each be attached to the adjoining member by an adhesive, adhesive tape, glue or epoxy or a combination of the same. Other possible means of attachment may include welding, fusing, clasps, clamps, or other suitable attachment means or a combination of such means. The individual components comprising the internal member 30 are now described in more detail.

Figure 12:
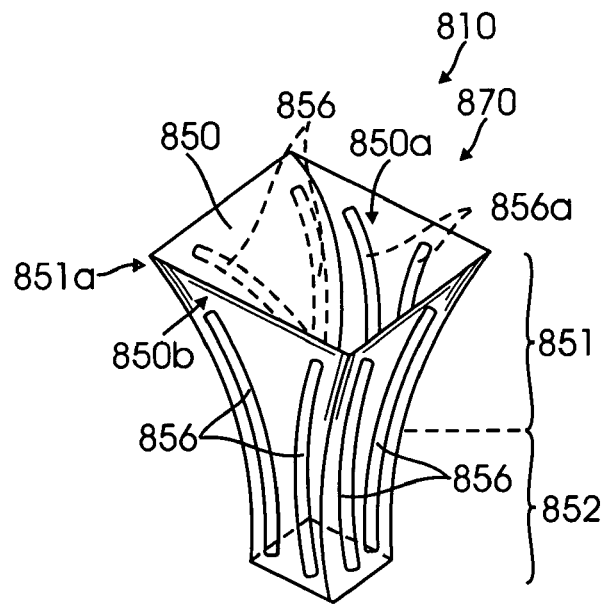
FIG. 12 is a perspective view of another embodiment of the sealing member, which further comprises seal support members.
Figure 16:
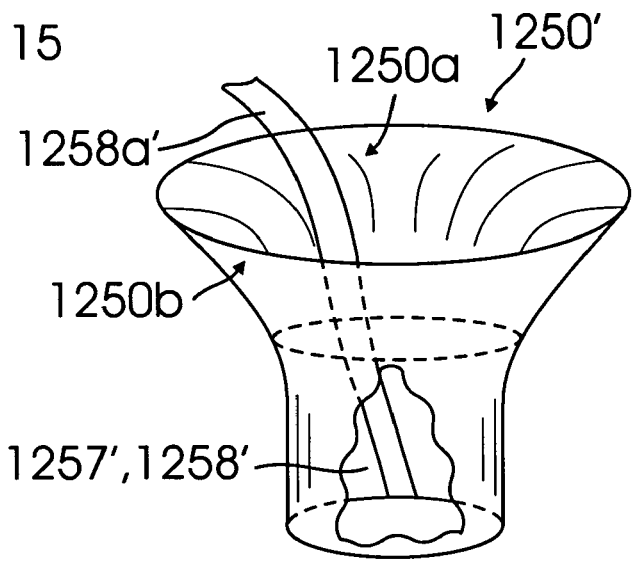
FIG. 16 is a partially broken away perspective view of another embodiment of the sealing member illustrating an embodiment of supplemental duct sealing means.

In the embodiment illustrated in FIG. 2, FIG. 3A and FIG. 3B, the seal transitional portion 51 of the sealing member 50 is shaped approximately as a hollow hyperboloid that has an open interior space. The seal adhering portion 52 is approximately tubular (a hollow cylinder) in shape and extends longitudinally away from the narrower open end 51b of the seal transitional portion 51. A seal inlet opening 53 is formed at the wider open end 51a of the seal transitional portion 51, and a seal outlet opening 54 is formed at the open end of the seal adhering portion 52. The seal transitional portion 51 is positioned approximately within the open end 21d of the case body 21 so that the seal inlet opening 53 generally coexists with the opening bounded by the case body open end 21d. The sealing member 50 extends from the case body open end 21d into the interior space 23 of the casing member 20. In this embodiment, the perimeter edge of the wider open end 51a of the seal transitional portion 51 (which is adjacent to the seal inlet opening 53) has approximately the same shape as the cross-sectional shape of the case body 21 adjacent to its open end 21d. Thus, the perimeter edge of the wider open end 51a of the seal transitional portion 51 is approximately circular in shape because the case body 21 is tubular (hollow cylinder) in shape. In other embodiments, the seal transitional portion 51 may have a different shape where necessary or desirable to conform to the cross-sectional shape of the case body 21. For example, as illustrated in FIG. 12, if the case body (not illustrated) has a square cross-section, the wider open end 851a of the sealing member 850 may also have a generally square shape of a size necessary to provide a fluid-tight seal with the case body, as described in more detail herein. Alternatively, as illustrated in FIG. 16, the transitional portion of the sealing member 50' may be approximately conically shaped. Referring again to the embodiment of the device 10 illustrated in FIG. 2, FIG. 3A and FIG. 3B, the seal transitional portion 51 is adapted to seal the perimeter of the wider open end 51a of the sealing member 50 to the casing member 20, while also providing a flexible fluid-impermeable barrier that extends from the case body 21 to the seal adhering portion 52, which must be small enough to accommodate the smallest size of duct (pipe 15) that may be connected to the device 10. The seal transitional portion 51 is shaped so that the duct (pipe 15) may be inserted into the sealing member 50 without excessively inhibiting the movement of the duct (pipe 15) into or tearing the sealing member 50. To accomplish this function, the seal transitional portion 51 may be shaped as one or more linear or arcuate segments or a combination of such segments when viewed in cross-section perpendicular to the longitudinal axis of the sealing member 50 (the axis defined by a line passing through the centers of the seal inlet opening 53 and the seal outlet opening 54). The cross-sectional dimension of the seal transitional portion 51 generally decreases with distance along the longitudinal axis from the wider open end 51a to the narrower open end 51b. Thus, as illustrated in FIG. 2, FIG. 3A and FIG. 3B, the seal transitional portion 51 preferably has a smooth arcuate shape when viewed perpendicular to the longitudinal axis of the sealing member 50, with the arc being oriented approximately 90 degrees relative to the case body 21 at its point of contact (the perimeter edge of wider open end 51a) with the case body 21 and facilitating a smooth transition into the seal adhering portion 52 at its other end 51b. More preferably, the seal transition portion 51 is shaped approximately as a hyperboloid, as is also illustrated in FIG. 2, FIG. 3A and FIG. 3B. It is to be noted that the insertion of the duct (pipe 15) into the sealing member 50 may be aided by internal seal support members 856a (FIG. 12), overlapping portions 1159a, 1159B (FIG. 17A and FIG. 17B) and supplemental duct sealing means, as all are described in more detail below.

In the embodiment of the device 10 illustrated in FIG. 2, FIG. 3A and FIG. 3B, the seal adhering portion 52 is approximately tubular in shape. This shape, which is approximately the same as the exterior surface of the duct (pipe 15 at its end 17), may allow for a fluid-tight seal around the entire perimeter of the duct (pipe 15) at its end 17. In other embodiments, the seal adhering portion 52 may have different shapes. For example, the seal adhering portion 52 may have a conical shape longitudinally or a cross-sectional shape that is approximately elliptical, triangular, square, rectangular, another polygonal shape, or another shape or combination of such shapes where such shape may better accommodate the size and shape of the duct (pipe 15). In such cases, the shape of the seal transitional portion 51 is generally adapted to make a smooth transition into the shape of the seal adhering portion 52. For example, as illustrated in FIG. 12, if the seal adhering portion 852 has a square cross-sectional shape, the seal transitional portion 851 is smoothly transitioned into the cross-sectional shape of a square at its narrower open end 851b, such square generally being of the same size as the seal adhering portion 852. Referring again to the embodiment of the device 10 illustrated in FIG. 2, FIG. 3A and FIG. 3B, and as described in more detail below, the seal adhering portion 52 is preferably constructed of an elastic material so that it stretches to conform to the exterior surface of the duct (pipe 15) adjacent to the end 17 thereof, forming a fluid-tight seal between the seal adhering portion 52 and the duct (pipe 15). To enhance this seal, the seal adhering portion 52 preferably has a cross-sectional area that is approximately the same along its entire length. Its cross-sectional area is also preferably the same as or slightly smaller than the cross-sectional area of the smallest duct (pipe 15) that may be connected to the device 10. The seal adhering portion 52 preferably extends a distance along the longitudinal axis of the sealing member 50 adequate to produce a fluid-tight seal between the interior surface 50a of the seal adhering portion 52 and the exterior surface of the duct (pipe 15) adjacent to the end 17 thereof. It is to be noted, however, that in some embodiments it is not necessary that the contact between the seal adhering portion 52 and the duct (pipe 15) alone provide a fluid-tight seal. Supplemental duct sealing means, as described in more detail below, may be used to provide or enhance this seal. The seal adhering portion 52 may also have grooves 55 positioned adjacent to the seal outlet opening 54 where desirable for operation of the support assembly 70, as described in more detail below.

The sealing member 50 is generally constructed of materials that permit it to expand to conform to the exterior surface of the largest size of duct (adjacent to the end 17 of pipe 15) that may be connected to the device 10, while still maintaining the structural integrity of the sealing member 50 during operation of the device 10. In addition, the materials are preferably compatible with the type of fluid anticipated in the interior space 16 of the duct (pipe 15) and thus, anticipated in the chamber 40. For example, the sealing member 50 may be comprised of any suitable elastic material, such as rubber, synthetic rubber (including NEOPRENE), elastomers or other elastic polymers, or combinations of such materials, along with a combination that may including cloth, fabric or other flexible or semi-flexible materials. It is to be noted, however, that the sealing member 50 need not be constructed entirely of flexible or elastic materials. For example, the portion of the seal transitional portion 51 adjacent to the perimeter edge of the wider open end 51a may be comprised of a rigid or semi-rigid material, such as wood, ceramic, metal, fiberglass, carbon-based or other composites, rigid or semi-rigid polymers (such as polyvinyl chloride and polycarbonate), or other rigid or semi-rigid materials or a combination of such materials. This may assist in facilitating a fluid-tight seal between the seal transitional portion 52 and the case body 21 in some embodiments. In addition, the sealing member 50 may be comprised of materials having varying degrees of elasticity. For example, the portions of the seal transitional portion 52 adjacent to the perimeter of the wider open end 51*a* may be comprised of a more rigid material than the portions adjacent to the narrower open end 51*b*. As another example, the seal adhering portion 52 may be comprised of a more elastic material than the material comprising the seal transitional portion 51. As yet another example, the portion of the seal adhering portion 52 adjacent to the seal transitional portion 51 may be comprised of a more elastic material than that comprising the portion of the seal adhering portion 52 adjacent to the seal outlet opening 54. Alternatively, the elasticity of various portions of the sealing member 50 may be varied by varying the thickness of the material comprising the sealing member 50 used with such portions. For example, the seal transitional portion 51 may be constructed of thicker material than the seal transitional portion 51, so that the seal transitional portion 51 is generally not as elastic as the seal adhering portion 52. By varying the elasticity of the various portions of the sealing member 50, the ability of the sealing member 50 to form a fluid-tight seal with the duct (pipe 15) and to grip the duct (pipe 15) to operatively hold it in place may be optimized. Thus, the outer portions of the seal transitional portion 51 may be comprised of a less elastic material than the seal adhering portion 52 and the inner portions of the seal transitional portion 51. This allows the duct (pipe 15) to be more easily inserted into the sealing member 50, while providing resistance to movement of the sealing member longitudinally if thrust loads are applied to the device 10, as described in detail below.

The thickness of the material comprising the sealing member 50 must be such that it allows for expansion of the sealing member 50 to conform to the exterior surface of the largest size of duct (adjacent to the end 17 of pipe 15) that may be connected to the device 10, while still maintaining the structural integrity of the sealing member 50 during operation of the device 10. The preferred thickness is dependent upon a number of different factors, such as the anticipated range of shapes and sizes of the duct (pipe 15) to be accommodated by the device 10, the size and shape of the internal member 30, the anticipated operating pressures of the device 10 (i.e., the pressures expected in the chamber 40), the type of internal member connecting means (described in more detail below) utilized in the device 10, the type of internal support means (described in more detail below) utilized in the device 10, the preferences of the user of the device 10, and other factors. The sealing member 50 may be constructed using any suitable means. For example, a sealing member 50 constructed entirely of synthetic rubber may be cast in a mold. As another example, a sealing member 50 comprised of one or more materials may have various components assembled utilizing adhesives, welding, fusing or any other suitable means.

Figure 11:
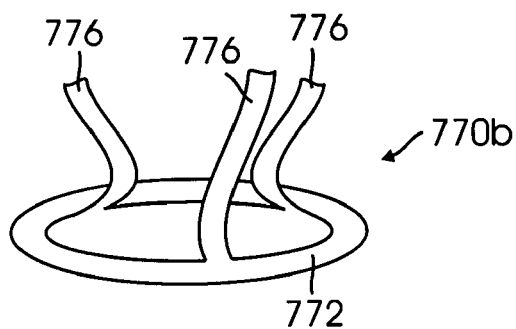
FIG. 11 is a perspective view of another embodiment of a subassembly of the support assembly, as viewed from the side of and above the subassembly.
Figure 13:
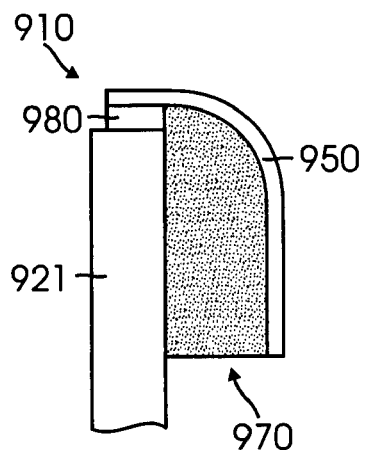
FIG. 13 is a sectional view of an embodiment of a foam support member comprising the internal support means and the support assembly, which foam support member is illustrated as positioned between the case body and the sealing member.
Figure 14C:
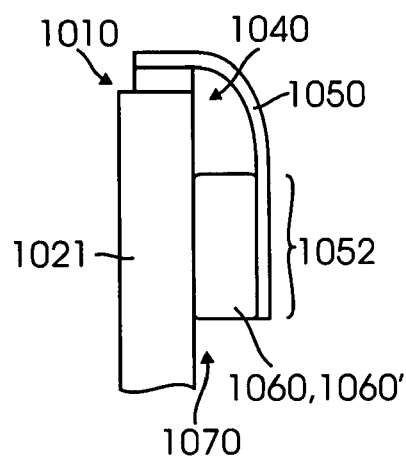
FIG. 14C is a sectional view of an embodiment of a compressible insert, which is illustrated as positioned between the case body and the sealing member.
Figure 15:
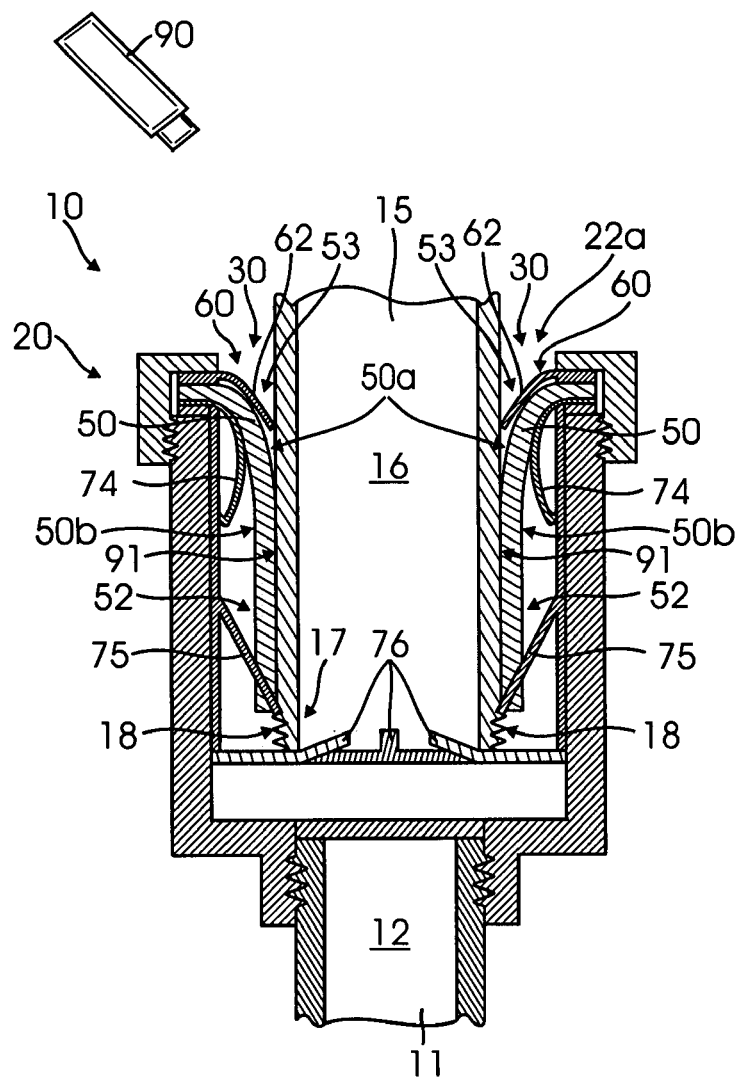
FIG. 15 is a sectional view of the embodiment of the device illustrated in FIG. 1 and FIG. 2, as taken along the lines 2-2 in FIG. 1, illustrating the operation of the device when connecting to a larger size of duct.
Figure 17A:
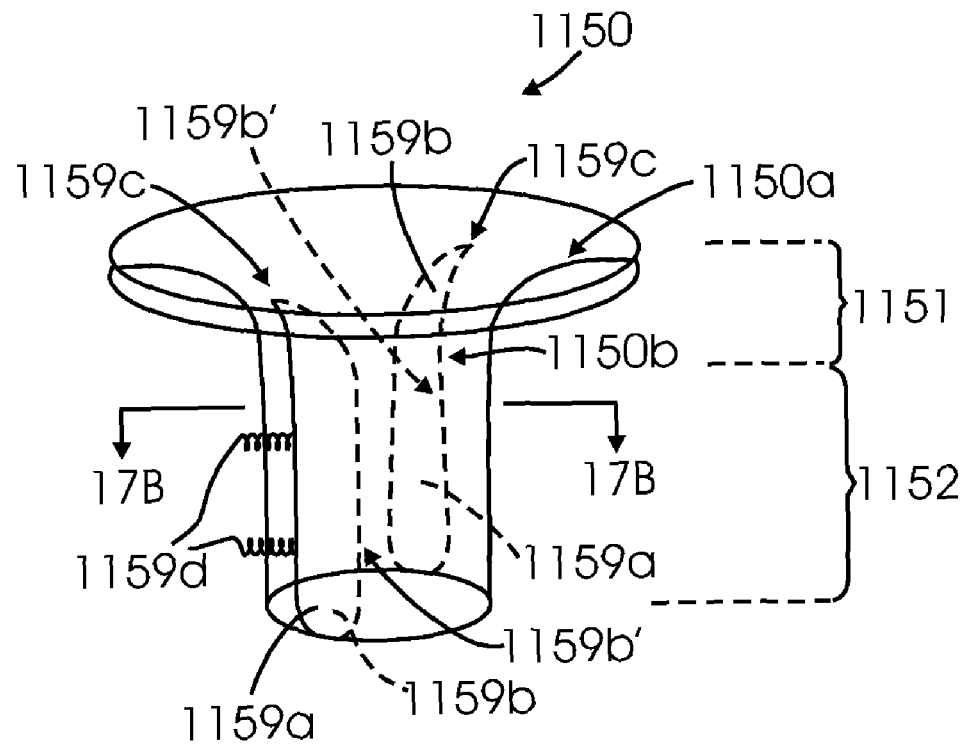
FIG. 17A is an enlarged perspective view of another embodiment of the sealing member, as viewed from the side of and above the sealing member.
Figure 17B:
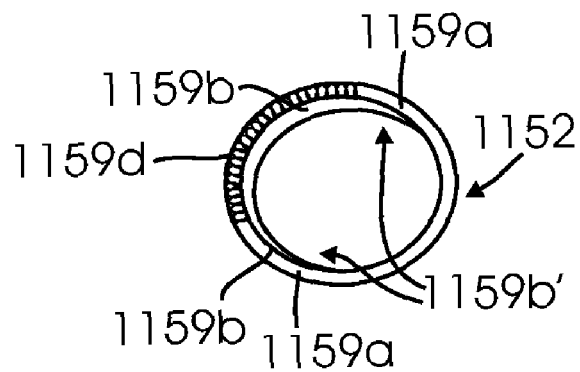
FIG. 17B is a sectional plan view of the embodiment of the sealing member illustrated in FIG. 17A, as taken along the lines 17B-17B in FIG. 17A.

As illustrated in FIG. 17A and FIG. 17B, the sealing member 1150 may have a different construction in other embodiments. For example, the sealing member 1150 may have substantially the same characteristics, features, structure and operation as any of the sealing members 50, 50', 850 described above and illustrated in connection with FIG. 2, FIG. 3A, FIG. 3B, FIG. 12, and FIG. 16, except that the sealing member 1150 is comprised of overlapping portions 1159*a*, 1159*b* that extend longitudinally along a portion of the seal transitional portion 1151 and along the entire length of the seal adhering portion 1152. In this embodiment, the overlapping portions 1159*a*, 1159*b* commence at an apex 1159*c* on the seal transitional portion 1152 and gradually increase in width until they reach an approximately constant width along the longitudinal axis of the seal adhering portion 1152. It is to be noted that the width, length and geometry of the overlapping portions 1159*a*, 1159*b* may be different in other embodiments. The interior overlapping portions 1159*b* may also have a tapered edge 1159*b*' so that the transition between the overlapping portions 1159*a*, 1159*b* is relatively smooth, allowing for the entire circumference of the interior surface 1150*a* of the seal adhering portion 1152 to fit tightly against the exterior surface of the duct (not illustrated). Although the illustrated embodiment is the more preferred embodiment, there may be more or fewer overlapping portions 1159*a*, 1159*b* in other embodiments. For example, in some embodiments there may be one overlapping portion 1159*a*, 1159*b* (where the seal adhering portion 1152 is comprised of one piece with a single slit), while in other embodiments there may be three overlapping portions 1159*a*, 1159*b* (where the seal adhering portion 1152 is comprised of three pieces with three slits). Preferably, there are at least two overlapping portions 1159*a*, 1159*b* and no more than three overlapping portions 1159*a*, 1159*b*. In the illustrated embodiment, the sealing member 1150 is also comprised of at least one expandable member 1159*d*, which extends around the outside surface of the interior overlapping portions 11596 and may connect the exterior overlapping portions 1159*a* together or extend around the circumference of the exterior surface 1150*b* of the sealing member 1150. The at least one expandable member 1159*d* is comprised of a resilient material that exerts force against the exterior overlapping portions 1159*a*, tending to pull them together, and therefore tending to minimize the circumference of the seal adhering portion 1152 and the portion of the seal transitional portion 1151 adjacent to the seal adhering portion 1152. The at least one expandable member 1159*d* may be comprised of any suitable material, such as a spring (which may be comprised of metal or other materials), cords, bands or braids (which may be comprised of elastic polymer materials), other elastic materials or a combination thereof. In some embodiments, there may be more than or fewer than two expandable members 1159*d*, as is illustrated FIG. 17A and FIG. 17B. In other embodiments, the at least one expandable member 1159*d* may also have a different configuration. For example, the expandable members 1159*d* may be oriented in a crossing pattern, rather than extending approximately parallel around the interior overlapping portions 1159*b*, as is illustrated FIG. 17A and FIG. 17B. In operation, as the duct is inserted into the sealing member 1150, the sealing member 1150 may expand to fit the duct exterior surface by the overlapping portions 1159*a*, 1159*b* sliding over one another to increase the interior size (diameter in this case) of the seal adhering portion 1152. The expandable members 1159*d* place tension on the overlapping portions 1159*a*, 1159*b*, tending to restrict the diameter of the sealing member 1150 and operatively holding the overlapping portions 1159*a*, 1159*b* in place relative to one another and the duct. In other embodiments, other portions of the support assembly may also serve to assist in operatively holding the overlapping portions 1159*a*, 1159*b* in place relative to one another and the duct (pipe 15). For example, a portion of the support assembly (such as inlet radial support members 74 and outlet radial support members 75, as illustrated in FIG. 2 and FIG. 15, and outlet radial support members 775. as illustrated in FIG. 11) may also serve as "expandable members" to assist in operatively holding the overlapping portions 1159a, 1159b in place relative to one another and the duct (pipe 15). As another example, as illustrated in FIG. 12. all or a portion of the seal support members 856 may also serve as "expandable members" to assist in this function. Further, as illustrated in FIG. 13 and FIG. 14C, all or a portion of the foam support members 970 or compressible inserts 1060 may also serve as "expandable members" to assist in this function. These members 74, 76, 775, 856, 970, 1060 are "expandable members" in the sense that they are adapted to deform to allow the sealing member 1150 to expand to accommodate connection to the duct, while applying a force against various portions of the sealing member 1050 that tend to hold such portions, including the overlapping portions 1159a, 1159b, in place relative to one another and the duct. Preferably, for devices 10 utilizing the internal support means of the illustrated embodiment and designed for use with tubular ducts (pipe 15) having a nominal diameter in the range of ½" to ¾" carrying potable water for domestic use, the sealing member 50 has two overlapping portions 1159a, 1159b and is comprised entirely of NEOPRENE having a thickness in the range of 1/16 inch to 1/8 inch.

Figure 5:
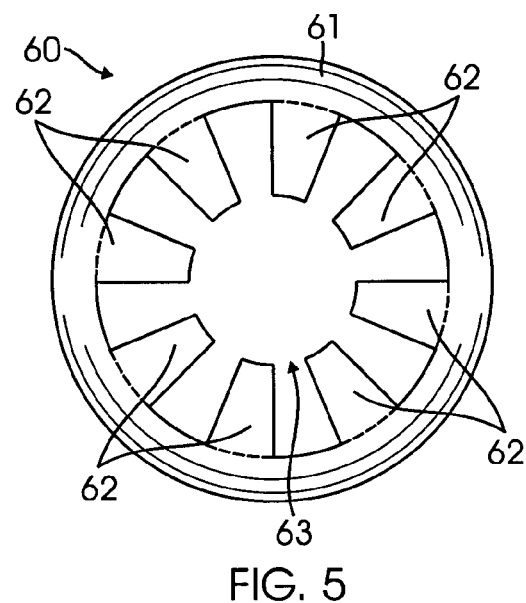
FIG. 5 is an enlarged plan view of the embodiment of the cover plate that comprises a part of the device illustrated in FIG. 3A.

In the embodiment of the device 10 illustrated in FIG. 2, FIG. 3A and FIG. 3B, the internal support means are comprised of a cover plate 60 and a support assembly 70. The cover plate 60 is comprised of a perimeter plate support portion 61 and a plurality of tab portions 62 that extend from the perimeter plate support portion 61 into the interior area bounded by the perimeter plate support portion 61. A plan view of the cover plate 60 is illustrated in FIG. 5. The perimeter plate support portion 61 is preferably positioned approximately in the open end 21d of the case base 21, as illustrated in FIG. 2. In the illustrated embodiment, each of the tab portions 62 generally extends into the interior space a predetermined distance, so that a cover opening 63 is formed that is generally bounded by the distal ends of the tab portions 62. Preferably, the cover opening 63 is of the same approximate size and shape as the size and shape of the smallest duct (pipe 15) expected to be connected to the device 10, but some or all of the tab portions 62 may extend into the cover opening 63 or form a cover opening 63 that is smaller than the minimum duct (pipe 15) size. The cover plate 60 may have a different size and shape in other embodiments of the present invention. For example, where the case base 21 has a square cross-section, it may be necessary or desirable for the cover plate 60 to be square as well to facilitate its connection to the case base 21. In addition, there may be more or fewer tab portions 62, and the tab portions 62 may have a different shape than that illustrated in FIG. 2, FIG. 3A, and FIG. 5, in other embodiments. The tab portions 62 may also have different lengths. Although the perimeter plate support portion 61 may have the same thickness as the tab portions 62 in some embodiments, in other embodiments the perimeter plate support portion 61 may have a thickness different than one or more of the tab portions 62. This is the case for the embodiment illustrated in FIG. 2, FIG. 3A, and FIG. 5, where the perimeter plate support portion 61 has a greater thickness than the tab portions 62. In addition, the thickness of the tab portions 62 may vary over their length. For example, the tab portions 62 may be thicker adjacent to the perimeter plate support portion 61 than they are at their distal ends. Alternatively, the tab portions 62 may have one or more indentations that allow them to bend more easily at the point of the indentation. The cover plate 60 may be constructed of any suitable material, such as a malleable metal or semi-rigid polymer. Although the perimeter plate support portion 61 and the tab portions 62 are preferably comprised of the same material, they may be comprised of different materials in various embodiments. It is to be noted that the cover plate 60 may not be utilized in some embodiments of the present invention, and that more than one cover plate 60 may be utilized in other embodiments of the present invention. In order to protect the sealing member 50, however, it is preferred that the device utilize one cover plate 60. The cover plate 60 may be fabricated using any suitable means, such as injection molding for cover plates 60 comprised of polymers and metal stamping for cover plates 60 comprised of metals. More preferably, the cover plate 60 has the geometry illustrated in FIG. 2, FIG. 3A, and FIG. 5 and is comprised of aluminum, which may be fabricated using metal stamping.

In the embodiment of the device 10 illustrated in FIG. 2 and FIG. 3B, the support assembly 70 is comprised of an inlet perimeter support member 71, an outlet perimeter support member 72, a plurality of longitudinal support members 73, a plurality of inlet radial support members 74, a plurality of outlet radial support members 75, and a plurality of duct end support members 76, all of which may sometimes be referred to herein in whole or in part as "support members." In this embodiment, the inlet perimeter support member 71 is an annular-shaped rigid member. Also, in this embodiment, the inlet perimeter support member 71 is rigidly connected to the casing member 20, being positioned between the washer 80 and the perimeter edge portion of the wider open end 51a of the seal transitional portion 51. Preferably, the inlet perimeter support member 71 is attached to the washer 80 and the perimeter edge portion of the wider open end 51a of the seal transitional portion 51 using any suitable means, such as an adhesive, adhesive tape, glue, epoxy, or other means or a combination of such means. The inlet perimeter support member 71 may have a different size and shape in other embodiments of the present invention. For example, where the case base 21 has a square cross-section, it may be necessary or desirable for the inlet perimeter support member 71 to be square to facilitate its connection to the case base 21. In addition, although the inlet perimeter support member 71 is connected to the exterior surface 50b of the sealing member 50 in the illustrated embodiment, the inlet perimeter support member 71 may be positioned adjacent to or be connected to the interior surface 50a of the sealing member 50, in whole or in part, in other embodiments The inlet perimeter support member 71 may be constructed of any suitable material, as long as the inlet perimeter support member 71 is capable of performing its function (in this embodiment) as the primary point of connection of the support assembly 70 to the casing member 20. Preferably, the inlet perimeter support member 71 is comprised of a rigid or semi-rigid material, such as metal (e.g., spring steel, copper, brass, aluminum, another steel, or steel or metal alloy), wood, ceramic, fiberglass, carbon-based or other composites, rigid or semi-rigid polymers (such as polyvinyl chloride and polycarbonate), or other rigid or semi-rigid materials or a combination of such materials. In addition, it is preferred that the material comprising the inlet perimeter support member 71 be compatible with the fluid carried by the duct (pipe 15) and object (pipe 11).

In the embodiment of the device 10 illustrated in FIG. 2 and FIG. 3B, the plurality of longitudinal support members 73 extend from the interior edge of the inlet perimeter support member 71 to the exterior edge of the outlet perimeter support member 72. Preferably, the plurality of longitudinal support members 73 are positioned approximately adjacent to the interior surface of the case base 21 along their entire length, but they need not be so positioned in every embodiment of the present invention. In this embodiment, the respective ends of each of the longitudinal support members 73 are rigidly connected to the inlet perimeter support member 71 and the outlet perimeter support member 72. This connection is preferably accomplished by a suitable joining means, such as an adhesive, adhesive tape, glue, epoxy, welding, fusing, brazing, or other joining means or a combination of such means. Alternatively, one or more of the longitudinal support members 73 may be fabricated along with the inlet perimeter support member 71 or the outlet perimeter support member 72 or both as a single component. In other embodiments, however, this connection may be accomplished using other means. For example, as illustrated in FIG. 6, the longitudinal support members 73' may each have a tab portion 73a' that extends radially outward, which is positioned between the inlet support ring member 71' and the washer 80' with or without the use of any joining means other than compression on each of such components longitudinally when the cap case 22' is screwed onto the case body 21'. Referring again to the embodiment of the device 10 illustrated in FIG. 2 and FIG. 3B, the longitudinal support members 73 may be constructed of any suitable rigid material, as long as the longitudinal support members 73 are together capable of performing their intended function of providing longitudinal support to the support assembly 70 during operation of the device 10, as described in more detail below. Preferably, the longitudinal support members 73 are comprised of a rigid or semi-rigid material, such as metal (e.g., spring steel, copper, brass, aluminum, another steel, or steel or metal alloys), wood, ceramic, fiberglass, carbon-based or other composites, rigid or semi-rigid polymers (such as polyvinyl chloride and polycarbonate), or other rigid or semi-rigid materials or a combination of such materials. In addition, it is preferred that the material comprising the longitudinal support members 73 be compatible with the fluid carried by the duct (pipe 15) and object (pipe 11). Although four longitudinal support members 73 are illustrated, there may be fewer or more longitudinal support members 73 in other embodiments. Preferably, there are at least three longitudinal support members 73 and no more than six longitudinal support members 73. In addition, it is to be noted that the longitudinal support members 73 may have a shape and size different from that illustrated in FIG. 2 and FIG. 3B in other embodiments of the present invention. For example, as described in more detail below, one or more of the longitudinal support members 73 may have one or more segments that are linear or arcuate in shape or a combination of such shapes when viewed from almost any perspective.

Figure 7:
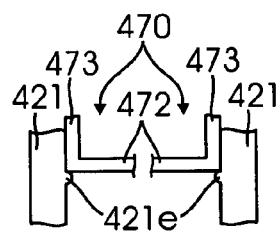
FIG. 7 is a partial sectional view of another embodiment of the outlet perimeter support member, as positioned adjacent to a ridge or similar structure protruding from the interior surface of the case body along all or a portion of the interior circumference of the case body.

In the embodiment of the device illustrated in FIG. 2 and FIG. 3B, the outlet perimeter support member 72 is an annular-shaped rigid member. The outlet perimeter support member 72 is positioned approximately adjacent to the interior surface of the case body 21 around its outside perimeter in this embodiment, but the outlet perimeter support member 72 need not be so positioned in every embodiment of the present invention. As illustrated in FIG. 7, and in order to provide additional structural strength to the support assembly, the outlet perimeter support member 472 may be positioned adjacent to a ridge 421e or similar structure protruding from the interior surface of the case body 421 along all or a portion of the interior circumference of the case body 421. In this embodiment, the surface of the outlet perimeter support member 472 opposite the longitudinal support members 473 is placed adjacent to the ridge 421e. Referring again to the embodiment of the device 10 illustrated in FIG. 2 and FIG. 3B, although the outlet perimeter support member 72 is not rigidly connected to the casing member 20 in this embodiment (or the embodiment of FIG. 7), it may be so connected in other embodiments. In such embodiments, the outlet perimeter support member 72 may be attached to the interior surface of the case body 21 (or other structure, such as ridge 421d) using any suitable means, such as an adhesive, adhesive tape, glue, epoxy, welding, fusing or other means or a combination of such means. Alternatively, the outlet perimeter support member 72 may be fabricated as a single piece along with the case body 21. The outlet perimeter support member 72 may have a different size and shape in other embodiments of the present invention. For example, where the case base 21 has a square cross-section, it may be necessary or desirable for the outlet perimeter support member 72 to be square as well to facilitate its being positioned adjacent to the case base 21. In still other embodiments, the outlet perimeter support member 72 may not be positioned adjacent to the interior surface of the case base 21 along its entire perimeter, but may be comprised of one or more segments or members that are linear or arcuate in shape or a combination of such shapes when viewed from almost any perspective. For example, the outlet perimeter support member 72 may be approximately elliptical, triangular, square, rectangular, pentagonal, another polygonal shape, other shapes having arcuate or linear segments or portions, or another shape or a combination of such shapes when viewed from any perspective, which may or may not come into contact with the case base 21 only at certain points. The outlet perimeter support member 72 may be constructed of any suitable material, as long as the outlet perimeter support member 72 is capable of performing its function (in this embodiment) of assisting the support assembly 70 in operatively holding the duct (pipe 15) and the sealing member 50 in place relative to the casing member 20. Preferably, the outlet perimeter support member 72 is comprised of a rigid or semi-rigid material, such as metal (e.g., spring steel, copper, brass, aluminum, another steel, or steel or metal alloys), wood, ceramic, fiberglass, carbon-based or other composites, rigid or semi-rigid polymers (such as polyvinyl chloride and polycarbonate), or other rigid or semi-rigid materials or a combination of such materials. In addition, it is preferred that the material comprising the outlet perimeter support member 72 be compatible with the fluid carried by the duct (pipe 15) and object (pipe 11). It is to be noted that in yet other embodiments, the support assembly 70 may not have an outlet perimeter support member 72, as described in more detail below.

In the embodiment of the device 10 illustrated in FIG. 2 and FIG. 3B, the plurality of duct end support members 76 extend from the interior perimeter edge of the outlet perimeter support member 72 into the interior space within the outlet perimeter support member 72. The duct end support members 76 extend into the interior space of the case body 21 a distance great enough so that they will abut against the end 17 of the smallest size of duct (pipe 15) that may be connected to the device 10 when the duct (pipe 15) is inserted into the device 10. In addition, the duct end support members 76 are preferably shaped to minimize the disruption of fluid flowing between the duct (pipe 15) and the object (pipe 11). Thus, the duct end support members 76 act as a stop, preventing the duct (pipe 15) from being inserted into the casing member 20 beyond the duct end support members 76, while still allowing for relatively unrestricted fluid flow through the device 10. In this embodiment, one end of each of the duct end support members 76 is rigidly connected to the outlet perimeter support member 72. This connection is preferably accomplished by a suitable joining means, such as an adhesive, adhesive tape, glue, epoxy, welding, fusing, brazing, or other joining means or a combination of such means. Alternatively, one or more of the duct end support members 76 may be fabricated along with the outlet perimeter support member 72 as a single component. It is to be noted that in other embodiments one or more of the duct end support members 76 may be connected directly to (or may be a part of) one or more of the longitudinal support members 73, as described in more detail below. The duct end support members 76 may be constructed of any suitable rigid material, as long as the duct end support members 76 are together capable of performing their intended function of acting as a stop for the duct (pipe 15) while minimizing disruption of fluid flow through the device 10. Preferably, the longitudinal support members 73 are comprised of a rigid material, such as metal (e.g., spring steel, copper, brass, aluminum, another steel, or steel or metal alloys), wood, ceramic, fiberglass, carbon-based or other composites, rigid or semi-rigid polymers (such as polyvinyl chloride and polycarbonate), or other rigid or semi-rigid materials or a combination of such materials. In addition, it is preferred that the material comprising the duct end support members 76 be compatible with the fluid carried by the duct (pipe 15) and object (pipe 11). In the illustrated embodiment, there are four duct end support members 76. In other embodiments, there may be fewer of more duct end support members 76. Preferably, there are at least two duct end support members 76 and no more than five duct end support members 76. In addition, it is to be noted that the duct end support members 76 may have a shape and size different from that illustrated in FIG. 2 and FIG. 3B in other embodiments of the present invention. For example, one or more of the duct end support members 76 may have one or more segments that are linear or arcuate in shape or a combination of such shapes when viewed from almost any perspective. Preferably, as illustrated in FIG. 2 and FIG. 3B, the duct end support members 76 are angled toward the end 17 of the duct (pipe 15) at their distal ends so that they act as an additional means of centering the duct (pipe 15) radially within the casing member 20. In addition, it is preferred that the duct end support members 76 have a cross-section shaped approximately as an ellipse, with the major axis aligned longitudinally (with the direction of fluid flow through the device 10) to provide a more aerodynamic or hydrodynamic surface in order to minimize flow disruption. Further, although it is preferred that the duct end support members 76 do not extend across the entire interior dimension of the case body 21 in order to minimize fluid flow disruption, as illustrated in FIG. 2 and FIG. 3B, one or more of the duct end support members 76 may extend across the entire interior dimension of the case body 21 in other embodiments of the present invention.

In the embodiment of the device 10 illustrated in FIG. 2 and FIG. 3B, the plurality of inlet radial support members 74 extend from the interior perimeter edge of the inlet perimeter support member 71 into the interior space within the inlet perimeter support member 71. Preferably, the inlet radial support members 74 conform approximately to the contour of the exterior surface 50$b$ of the seal transitional portion 51 of the sealing member 50 and generally extend along the exterior surface 50$b$ of the seal transitional portion 51 a distance great enough so that they cause the interior surface 50$a$ of the seal transitional portion 51 to abut against the exterior surface of the smallest size of duct (pipe 15) that may be connected to the device 10 while the duct (pipe 15) is inserted into the device 10. The inlet radial support members 74 are preferably constructed of a resilient material that may be deformed radially outward from the longitudinal center of the casing member 20 while the duct (pipe 15) is inserted into the device 10, but which apply a force radially inward against the duct (pipe 15) tending to operatively hold it in place radially with respect to the case body 21. The inlet radial support members 74 may be comprised of any suitable rigid or semi-rigid material, as long as the inlet radial support members 74 are together capable of performing their intended function of deforming when the duct (pipe 15) is inserted into the device 10 and operatively holding the duct (pipe 15) in place radially with respect to the casing member 20 while the duct (pipe 15) is so inserted. Preferably, the inlet radial support members 74 are comprised of a resilient rigid or semi-rigid material, such as metal (e.g., spring steel, copper, brass, aluminum, another steel, or steel or metal alloys), wood, fiberglass, carbon-based or other composites, rigid or semi-rigid polymers (such as polyvinyl chloride and polycarbonate), or other resilient rigid or semi-rigid materials or a combination of such materials. In addition, it is preferred that the material comprising the inlet radial support members 74 be compatible with the fluid carried by the duct (pipe 15) and the object (pipe 11). More preferred, the inlet radial support members 74 are comprised of spring steel covered by an appropriate protective coating where necessary to protect the spring steel against the type of fluid expected to be carried by the duct (pipe 15) and the object (pipe 11). In this embodiment, one end of each of the inlet radial support members 74 is rigidly connected to the inlet perimeter support member 71. This connection is preferably accomplished by a suitable joining means, such as an adhesive, adhesive tape, glue, epoxy, welding, fusing, brazing, or other joining means or a combination of such means. Alternatively, one or more of the inlet radial support members 74 may be fabricated along with the inlet perimeter support member 71 as a single component. It is to be noted that in other embodiments one or more of the inlet radial support members 74 may be connected directly to (or may be a part of) one or more of the longitudinal support members 73, as described in more detail below. In the illustrated embodiment, there are four inlet radial support members 74. In other embodiments, there may be fewer or more inlet radial support members 74. Preferably, there are at least three inlet radial support members 74 and no more than five inlet radial support members 74. In addition, it is to be noted that the inlet radial support members 74 may have a shape and size different from that illustrated in FIG. 2 and FIG. 3B in other embodiments of the present invention. For example, one or more of the inlet radial support members 74 may have one or more segments that are linear or arcuate in shape or a combination of such shapes when viewed from almost any perspective. Although not always the case, the inlet radial support members 74 are preferably attached to the exterior surface 50$b$ of the sealing member 50 along all or a part of their length to assist in holding the sealing member 50 in place relative to the pipe 15 and casing member 20.

Figure 8:
FIG. 8 is an enlarged plan view of another embodiment of the distal end portion of the outlet radial support members.

In the embodiment of the device 10 illustrated in FIG. 2 and FIG. 3B, each of the plurality of outlet radial support members 75 extends from one of the longitudinal support members 73 into the interior space 23 within the case body 21. Preferably, the outlet radial support members 75 generally extend into the interior space 23 of the case body 21 a distance great enough so that they will abut against the exterior surface of the smallest size of duct (pipe 15) that may be connected to the device 10 when the duct (pipe 15) is inserted into the device 10. The outlet radial support members 75 are preferably constructed of a resilient material that may be deformed radially outward from the longitudinal axis of the casing member 20 when the duct (pipe 15) is inserted into the device 10, but which apply a force radially inward against the duct (pipe 15) tending to operatively hold it in place radially with respect to the case body 21. The outlet radial support members 75 may be comprised of any suitable rigid or semi-rigid material, as long as the outlet radial support members 75 are together capable of performing their intended function of deforming when the duct (pipe 15) is inserted into the device 10 and holding the duct (pipe 15) in place radially with respect to the casing member 20 while the duct (pipe 15) is so inserted. Preferably, the outlet radial support members 75 are comprised of a resilient rigid or semi-rigid material, such as metal (e.g., spring steel, copper, brass, aluminum, another steel, or steel or metal alloys), wood, fiberglass, carbon-based or other composites, rigid or semi-rigid polymers (such as polyvinyl chloride and polycarbonate), or other resilient rigid or semi-rigid materials or a combination of such materials. In addition, it is preferred that the material comprising the outlet radial support members 75 be compatible with the fluid carried by the duct (pipe 15) and the object (pipe 11). More preferred, the outlet radial support members 75 are comprised of spring steel covered by an appropriate protective coating where necessary to protect the spring steel against the type of fluid expected to be carried by the duct (pipe 15) and the object (pipe 11). In this embodiment, one end of each of the outlet radial support members 75 is rigidly connected to its respective longitudinal support member 73. This connection is preferably accomplished by a suitable joining means, such as an adhesive, adhesive tape, glue, epoxy, welding, fusing, brazing, or other joining means or a combination of such means. Alternatively, one or more of the outlet radial support members 75 may be fabricated along with its corresponding longitudinal support member 73 as a single component. It is to be noted that in other embodiments one or more of the outlet radial support members 75 may be connected directly to (or may be a part of) the inlet perimeter support member 71 or the outlet perimeter support member 72, as described in more detail below. In the illustrated embodiment, there are four outlet radial support members 75. In other embodiments, there may be fewer or more outlet radial support members 75. Preferably, there are at least three outlet radial support members 75 and no more than five outlet radial support members 75. In addition, it is to be noted that the outlet radial support members 75 may have a shape and size different from that illustrated in FIG. 2 and FIG. 3B in other embodiments of the present invention. For example, one or more of the outlet radial support members 75 may have one or more segments that are linear or arcuate in shape or a combination of such shapes when viewed from almost any perspective. As illustrated in FIG. 8, each of the outlet radial support members 75' may also preferably have an enlarged portion on the distal end 75a' thereof having a slightly arcuate shape so that the distal end 75a' may engage any threads present on the end of the duct (not illustrated), which may provide additional assistance in operatively holding the duct in place relative to the device against any thrust loads. Referring again to the embodiment of the device 10 illustrated in FIG. 2 and FIG. 3B, where it may be necessary or desirable to accommodate operation of the outlet radial support members 75, the sealing member 50 may have grooves 55 cut therein so that the distal ends of the outlet radial support members 75 may be positioned directly against the exterior surface of the duct (pipe 15).

It is to be noted that there are numerous potential variations in the structure, features, characteristics and operation of the internal support means and the support assembly 70. While the internal support means and the support assembly 70 are described in conjunction with the preferred aspects, versions and embodiments, it is to be noted that the aspects, versions and embodiments are not intended to limit the invention to those aspects, versions and embodiments. On the contrary, the internal support means and the support assembly 70 are specifically intended to cover alternatives, modifications and equivalents, which may be included within the spirit and scope of the invention as defined by the appended claims.

Figure 9A:
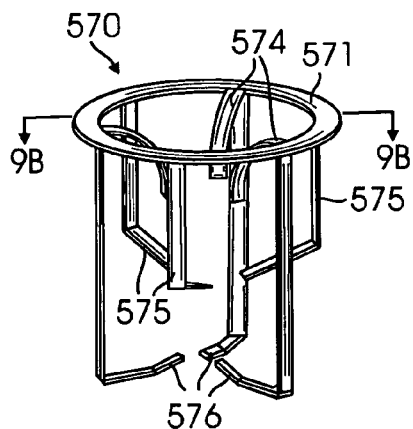
FIG. 9A is a perspective view of another embodiment of the support assembly, as viewed from the side of and above the support assembly.
Figure 9B:
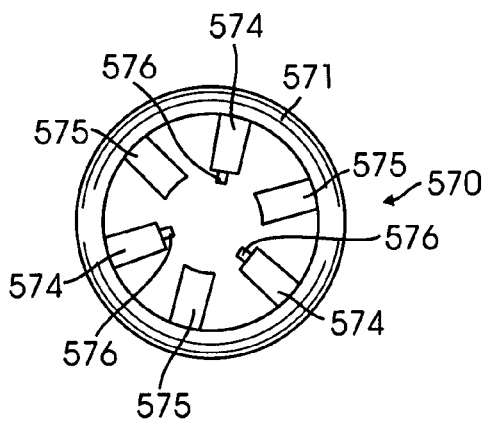
FIG. 9B is a plan view of the embodiment of the support assembly illustrated in FIG. 9A, as taken along the lines 9B-9B in FIG. 9A.

For example, all or a portion of the internal support means or the support assembly 70 may be attached to the casing member 20 using any suitable means, such as an adhesive, adhesive tape, glue, epoxy, welding, fusing, brazing, or other attaching means or a combination of such means. Alternatively, all or a portion of the internal support means or the support assembly 70 may be fabricated as a single component along with the casing member 20. As another example, the support assembly 70 may also have the structure illustrated in FIG. 9A and FIG. 9B. In this embodiment, the support assembly 570 is comprised of an inlet perimeter support member 571, a plurality of inlet radial support members 574, a plurality of outlet radial support members 575, and a plurality of duct end support members 576. These members 571, 574, 575, 576 may each have substantially the same features, characteristics, structure and operation as the corresponding members 71, 71', 74, 75, 76, respectively, as described above and illustrated in connection with FIG. 2 through FIG. 8, except that the outlet radial support members 575 and the duct end support members 576 are each connected to the inlet perimeter support member 571 by a longitudinal portion having substantially the same features, characteristics, structure and operation as the longitudinal support members 73 in support assembly 70, 70' as described above and illustrated in connection with FIG. 2 through FIG. 8.

Figure 10:
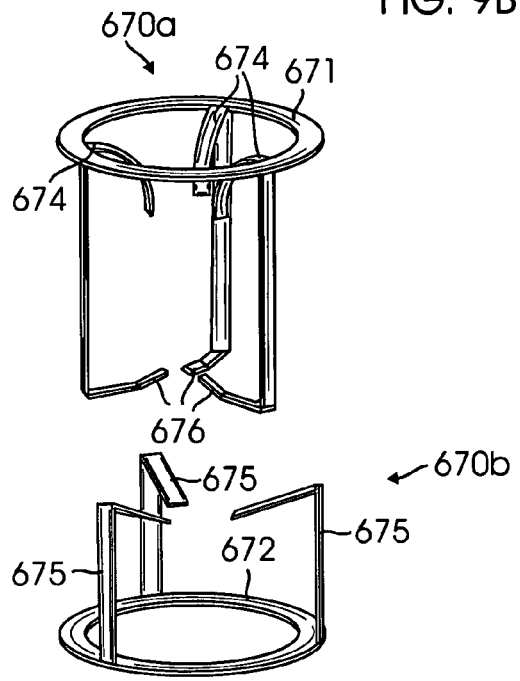
FIG. 10 is a perspective view of yet another embodiment of the support assembly, which comprises two subassemblies, as viewed from the side of and above the support assembly.

Yet another example is the multipart support assembly 670 illustrated in FIG. 10. In this embodiment, the support assembly 670 is comprised of two subassemblies 670a, 670b. Subassembly 670a is comprised of an inlet perimeter support member 671, a plurality of inlet radial support members 674, and a plurality of duct end support members 676. These members 671, 674, 676 may each have substantially the same features, characteristics, structure and operation as the corresponding members 571, 574, 576, respectively, in support assembly 570, as described above and illustrated in connection with FIG. 9A and FIG. 9B. Subassembly 670b is comprised of an outlet perimeter support member 672 and a plurality of outlet radial support members 675. These members 672, 675 may each have substantially the same features, characteristics, structure and operation as the corresponding members 72, 75, respectively, in support assembly 70, as described above and illustrated in connection with FIG. 2 through FIG. 8, except that the outlet radial support members 675 are each connected to the outlet perimeter support member 672 by a longitudinal portion having substantially the same features, characteristics, structure and operation as the longitudinal support members 73 in support assembly 70, as described above and illustrated in connection with FIG. 2 through FIG. 8. In this embodiment, the outlet perimeter support member 672 of subassembly 670b may be positioned adjacent to a ridge on the interior surface of the case body (not illustrated) substantially in the same manner as the outlet perimeter support member 472 of support assembly 470 is positioned adjacent to the ridge 421e of the case body 421, as described above and illustrated in connection with FIG. 7. Yet another embodiment of subassembly 670b is illustrated in FIG. 11. In this embodiment, the subassembly 770b is comprised of an outlet perimeter support member 772 and a plurality of outlet radial support members 775. The outlet radial support members 775 each have an arcuate shape so that they extend into the interior space of the outlet perimeter support member 772 and then radially outward. In some embodiments, a portion of the subassemblies 670a, 770a, 670b, 770b may be attached to the case body using any suitable means, such as an adhesive, adhesive tape, glue, epoxy, welding, fusing, brazing, or other attaching means or a combination of such means. Alternatively, all or a portion of the subassemblies 670a, 770a, 670b, 770b may be fabricated as a single component along with the case body.

Referring to FIG. 12 as an example, in still other embodiments, the sealing member 850, the internal support means, and the support assembly 870 may be comprised of one or more seal support members 856 that are incorporated as a part of the sealing member 850. For example, in the illustrated embodiment, a plurality of rigid or semi-rigid seal support members 856 are attached to the outside surfaces of the sealing member 850 along all or a portion of its length. The seal support members 856 generally allow the sealing member 850 to expand radially to accommodate multiple sizes and shapes of duct (not illustrated), but restrict movement of the sealing member 850 longitudinally to counter any thrust loads. The seal support members 856 may be comprised of any suitable rigid or semi-rigid material, as long as the seal support members 856 are together capable of performing their intended function. Preferably, the seal support members 856 are comprised of a resilient rigid or semi-rigid material, such as metal (e.g., spring steel, copper, brass, aluminum, another steel, or steel or metal alloys), wood, ceramic, fiberglass, carbon-based or other composites, rigid or semi-rigid polymers (such as polyvinyl chloride and polycarbonate), or other resilient rigid or semi-rigid materials or a combination of such materials. In addition, it is preferred that the material comprising the seal support members 856 be compatible with the fluid carried by the duct and the object (not illustrated). More preferred, the seal support members 856 are comprised of spring steel covered by an appropriate protective coating where necessary to protect the spring steel against the type of fluid expected to be carried by the duct and the object. The seal support members 856 may be attached to the surface of the sealing member 850 by any suitable attachment means, such as an adhesive, adhesive tape, glue, epoxy, welding, fusing, or other attachment means or a combination of such means. Alternatively, one or more of the seal support members 856 may be fabricated along with the sealing member 850 as a single component. This may also be the case where one or more of the seal support members 856 are comprised of the same material (which may be a flexible material in such embodiments) as the sealing member 850 and represent a ridge of thicker material that is positioned along the exterior surface 850b of the sealing member 850. As yet another alternative, the seal support members 856 may be embedded within the sealing member 850. Further, one or more of the seal support members 856a (each having substantially the same features, characteristics and function as the seal support members 856) may be attached to or be fabricated as a portion of the interior surface 850a of the sealing member 850. This may also protect the sealing member 850 against tearing or other damage as the duct is inserted into the sealing member 850. Supplemental duct sealing means (as described in more detail below) may be utilized with the device (not illustrated) in these embodiments to provide or enhance the seal between the sealing member 850 and the duct. In the illustrated embodiment, there are eight seal support members 856. In other embodiments, there may be fewer or more seal support members 856. The preferred number and position of seal support members 856 is dependent upon a number of factors, such as the geometry of the sealing member 850, the range of shapes and sizes of ducts to be connected to the device, the pressures anticipated in use of the device, the characteristics of other structural components of the internal support means and support assembly 870, and other factors. In addition, it is to be noted that the seal support members 856 may have a shape and size different from that illustrated in FIG. 12 in other embodiments of the present invention. For example, one or more of the seal support members 856 may have one or more segments that are linear or arcuate in shape or a combination of such shapes when viewed from almost any perspective.

Referring to FIG. 13 as an example, in still other embodiments, the internal support means and the support assembly 970 may be comprised of one or more foam support members 977 that are positioned between the case body 921 and the sealing member 950. In these embodiments, a foam support member 977 may extend circumferentially around the entire exterior surface 950b of the sealing member 950 or multiple foam support members 977 may be placed adjacent to only a portion of such exterior surface 950b. The foam support members 977 may be comprised of any resilient porous or open-cell foam material that is compatible with the fluid to be carried by the duct (not illustrated) and the object (not illustrated). For example, the foam support members 977 may be comprised of polyurethane foam or another type of open cell foam material or a combination of such foam materials. In addition, the one or more foam support members 577 may have voids, channels or other passages or a combination of the same positioned within the foam support member 577 that collapse when the duct is inserted into the device (not illustrated), allowing the sealing member 950 to expand radially to accommodate the duct. The foam support members 977 may or may not be used in conjunction with other support members comprising support assemblies 70, 70', 470, 570, 670, 770, 870, as described above and illustrated in connection with FIG. 2 through FIG. 14C.

Figure 14A:
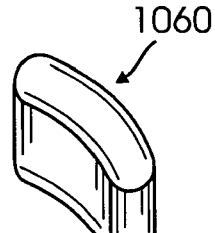
FIG. 14A is a perspective view of an embodiment of a compressible insert comprising the internal support means, as viewed from the side of and above the compressible insert.
Figure 14B:
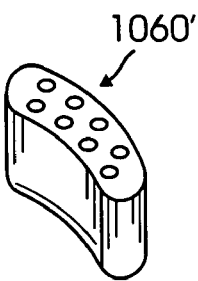
FIG. 14B is a perspective view of another embodiment of a compressible insert comprising the internal support means, as viewed from the side of and above the compressible insert.

As illustrated in FIG. 14A and FIG. 14B, the internal support means and the support assembly 1070 may also be comprised of compressible inserts 1060. In the embodiment illustrated in FIG. 14A, the compressible inserts 1060 may be comprised of hollow, inflatable bladders that contain a compressible fluid, such as air or nitrogen. In this case, the bladders are constructed in whole or in part of rubber, synthetic rubber, another flexible polymer, cloth, fabric, or other flexible materials or a combination of such materials. Alternatively, the compressible inserts 1060 may be comprised in whole or in part of a resilient foam-type of material that compresses when pressure is exerted on its surface. For example, the compressible inserts 1060 may be comprised of polyurethane foam or another type of open cell foam material or a combination of such materials. Such material may also be positioned within a bladder. In yet other embodiments, as illustrated in FIG. 14B, the compressible inserts 1060' may be comprised of semi-flexible materials that have a structure allowing them to be compressed, while exerting a counter force against compression. For example, the compressible inserts 1060' may be comprised of a semi-flexible polymer, such as silicone, having a "honeycomb" pattern, as illustrated in FIG. 14B. It is to be noted that many different combinations of materials and structures may be utilized in the compressible inserts 1060, 1060'. In any case, and referring to FIG. 14C as an example, the compressible inserts 1060, 1060' may be positioned within the chamber 1040 between the interior surface of the case body 1021 and the sealing member 1050. As the duct (not illustrated) is inserted into the device 1010, the seal adhering portion 1052 of the sealing member 1050 moves radially outward and exerts pressure against the compressible inserts 1060, 1060'. As the compressible inserts 1060, 1060' are compressed, they create a counter force, tending to exert pressure radially inward against the sealing member 1050, which is forced against the exterior surface of the duct. It is to be noted that in various embodiments, the compressible inserts 1060, 1060' may have almost any shape or combination of shapes, as long as the shape of the compressible inserts 1060, 1060' allows the sealing member 1050 to be radially displaced the appropriate distance, and the compressible inserts 1060, 1060' are able to perform their intended function of exerting radial inward pressure against the sealing member 1050. The compressible inserts 1060, 1060' may or may not be used in conjunction with other support members comprising support assemblies 70, 70', 470, 570, 670, 770, 870, as described above and illustrated in connection with FIG. 2 through FIG. 13.

Referring again to FIG. 2, FIG. 3A and FIG. 3B as an example, the internal member connecting means are used to connect the internal member 30 to the casing member 20. Preferably, this connection also provides a fluid-tight seal between the internal member 30 and the casing member 20. In the illustrated embodiment, the portion of the case cap 22 adjacent to the duct opening 22a is pressed against the perimeter edge portion of the cover plate 60, the perimeter edge portion of the wider open end 51a of the seal transitional portion 51, the inlet perimeter support member 71 of the support assembly 70, and the washer 80 as the case cap 22 is screwed down onto the case body 21. This compression acts as the internal member connecting means to connect the internal member 30 to the casing member 20, and also provides a fluid-tight seal between the internal member 30 and the casing member 20. In the illustrated embodiment, the internal member connecting means are also comprised of the washer 80 to assist in providing a fluid-tight seal. In other embodiments, the internal member connecting means may comprise any suitable means for providing a connection between one or more portions of the internal member 30 and one or more portions of the casing member 20, such as gaskets, o-rings, sealing compounds, adhesive, adhesive tape, glue, epoxy, welding fusing, compression of the joining portions of the internal member 30 and the casing member 20, fabrication of all or a portion of the internal member 30 as a part of the casing member 20, or any other connecting or sealing means or a combination of such means. Where washers 80, gaskets or o-rings are utilized, they may be constructed of any suitable materials, such as rubber, synthetic rubber, or other polymers. The preferred internal member connecting means are comprised of the internal member 30 being held in place between the case cap 22 and the case body 21 in the manner illustrated in FIG. 2, FIG. 3A and FIG. 3B. In embodiments where the internal support means are comprised of more than one component, such as the cover plate 60 and subassemblies (such as subassemblies 670a, 670b, 770b illustrated in FIG. 10 and FIG. 11 comprising the support assembly 670, 770, respectively), each of such components may be connected to the casing member, one another or other components comprising the internal member 30 using the internal member connecting means. It is to be noted that the internal member connecting means need not provide a fluid-tight seal in every embodiment of the present invention.

As described above with respect to the embodiment of the device 10 illustrated in FIG. 2, FIG. 3A and FIG. 3B, the preferred internal support means are dependent upon a number of factors that bear upon each of the members comprising the internal support means. The preferred embodiment of the internal support means includes a cover plate 60, as described above, and a support assembly 70 comprised of spring steel with an appropriate coating if necessary to protect the support assembly 70 from the fluid to be carried by the duct (pipe 15) and the object (pipe 11). The preferred geometry for the support assembly 70 is as set forth in FIG. 2 and FIG. 3B, which may be fabricated using a combination of meal stamping and forming, as well as brazing, welding or adhesives as a joining means. In addition, it is preferred that the sealing member 50 incorporate at least two seal support members 856a (see FIG. 12) on the internal surface 50a thereof that extend along the seal transitional portion 51. Preferably, the cover plate 60, the sealing member 50, the support assembly 70, and the washer 80 are joined together to form an internal member 30 that comprises a single unit, which may then be inserted into the interior space 23 of the case body 21, followed by placement of the case cap 22 on the case body 21, holding the internal member 30 in place relative to the casing member 20. It is to be noted, however, that in various embodiments of the invention one or more of the support members or other members or both that comprise the internal support means may not be used, such as where the intended use of the device 10 does not require such members. For example, various embodiments of the device 10 may incorporate outlet radial support members 75, but not inlet radial support members 74. As another example, neither of these may be required where a foam support member or compressible insert or both are utilized in the device 10.

The present invention also includes kits (not directly illustrated) that comprise various combinations of components of the present invention, such components being described in more detail elsewhere herein. For example, as best illustrated in FIG. 15, a kit may comprise any embodiment of the variable connecting means (which are described in more detail above and illustrated in connection with FIG. 2 through FIG. 17B) or the internal member 30 in combination with any embodiment of the casing member 20, as long as the variable connecting means or the internal member 30 is adapted to be positioned approximately within the at least one casing duct opening 22a and to extend into the casing interior space 23. As another example, a kit may comprise all or any portion of the various components comprising the variable connecting means (which are described in more detail above and illustrated in connection with FIG. 2 through FIG. 17B) or the internal member 30. As yet another embodiment, a kit may comprise any embodiment of the device 10 and any embodiment of the supplemental duct sealing means (which are described in more detail below), such as a container 90 (see FIG. 15) containing adhesive.

The present invention also includes a method of operating a variable joining device, as may be illustrated by reference to the embodiment of the device 10 best shown in FIG. 2 and FIG. 15. FIG. 15 illustrates the embodiment of the device 10 illustrated in FIG. 1 through FIG. 3B, but connected to a larger diameter of duct (pipe 15) than the duct (pipe 15) illustrated in FIG. 2. It is to be noted, however, that the duct (pipe 15) of FIG. 15 has threads 18 on its end 17, while the duct (pipe 15) of FIG. 2 does not have threads. The operation of the device 10 as part of a system in which the fluid is under pressure is as follows, but it is to be noted that the device 10 need not be operated as part of a system where the fluid is under pressure. First, the device 10 is selected and the threaded end 17 of the duct (pipe 15) is inserted into (and received by) the duct opening 22a of the casing member 20 and the seal inlet opening 53 of the internal member 30. In this embodiment, the duct (pipe 15) has a generally cylindrical shape and an outside diameter within a predetermined range. For example, the pipe 15 in some embodiments may have an outside diameter within the range of 0.8 inches to 1.0 inches. In addition, the duct (pipe 15) may have a variety of different thread 18 types on its end 17, as described in more detail above and illustrated in connection with FIG. 1 through FIG. 3B. Thus, the device 10 is capable of connecting to a variety of different types and sizes of ducts (pipe 15). As the duct (pipe 15) is being inserted into (and received by) the device 10, if the outside diameter of the duct (pipe 15) is the minimum acceptable diameter of the duct (pipe 15, as illustrated in FIG. 2) the distal end 17 of the duct (pipe 15) may travel down the longitudinal axis of the internal member 30 with only minimal contact against the sealing member 50. The duct (pipe 15) is advanced into the device 10 until a portion of the interior surface 50a of the sealing member 50 has expanded to conform to and is positioned adjacent to the exterior surface of the duct (pipe 15). In this case, the pipe 15 is operatively held in place in the device 10 primarily by the inward radial pressure of the inlet radial support members 74 and the outlet radial support members 75, and secondarily by the sealing member 50. In other embodiments, all or any combination of the internal support means (which are described in more detail above and illustrated in connection with FIG. 2 through FIG. 17B) may be used to hold the pipe 15 operatively in place in the device 10. In embodiments of the device 10 that comprise duct end support members 76, the duct (pipe 15) may be inserted into the device 10 until the duct open end 17 abuts against the duct end support members 76.

Referring to FIG. 15, in cases where the duct (pipe 15) has a relatively large diameter, as the duct (pipe 15) is inserted into the device 10, the duct (pipe 15) first impacts the tab portions 62 of the cover plate 60, causing the tab portions 62 to be deformed longitudinally in the direction of the sealing member 50. As the duct (pipe 15) continues into the device 10, the end 17 impacts the interior surface 50a of the sealing member 50, forcing the sealing member 50 to expand radially outward. This deformation also causes the inlet radial support members 74 to deform radially as well, so that the inlet radial support members 74 hold the duct (pipe 15) radially centered in the device 10 as the pipe continues its travel into the device 10. As the duct (pipe 15) is advanced further into the device 10, the duct (pipe 15) continues forcing the sealing member 50, and especially the seal adhering portion 52, to expand radially outward. The duct (pipe 15) is advanced into the device 10 until a portion of the interior surface 50a of the sealing member 50 has expanded to conform to and is positioned adjacent to the exterior surface of the duct (pipe 15). As illustrated in FIG. 17A and FIG. 17B, where the sealing member 1150 comprises at least one overlapping portion 1159a, 1159b, the duct is advanced into the sealing member 1150 so that the portions of the sealing member 1150 adjacent to the at least one overlapping portion 1159a, 1159b are displaced apart until a portion of the interior surface 1150a of the sealing member 1150 has expanded to conform to and is positioned adjacent to the exterior surface of the duct (pipe 15). Referring again to FIG. 15, the duct (pipe 15) also causes the outlet radial support members 75 to deform radially and longitudinally as well, so that the outlet radial support members 75 also hold the duct (pipe 15) radially centered in the device 10 as the pipe continues its travel into the device 10. The pressure exerted outward by the inlet radial support members 74 and the outlet radial support members 75 may also operatively hold the sealing member 50 and the duct (pipe 15) in place relative to the casing member 20. The longitudinal displacement of the outlet radial support members 75 also preferably causes them to engage the threads 18 on the duct (pipe 15) in cases where threads 18 are present, acting as an even greater restraining force to operatively hold the duct (pipe 15) in place. In other embodiments, all or any combination of the internal support means (which are described in more detail above and illustrated in connection with FIG. 2 through FIG. 17B) may be used to hold the pipe 15 operatively in place in the device 10. In embodiments of the device 10 that comprise duct end support members 76, the duct (pipe 15) may be inserting into the device 10 until the duct open end 17 abuts against the duct end support members 76. In embodiments of the present invention that further comprise object connecting means (as described in more detail above and illustrated in connection with FIG. 1 through FIG. 4D), the method of using the device 10 may be comprised of selecting the device 10, and in any order: (a) connecting the duct (pipe 15) to the device 10 by inserting the duct (pipe 15) into the casing duct opening 22a and advancing the duct (pipe 15) into the device 10 until a portion of the interior surface 50a of the sealing member 50 has expanded to conform to and is positioned adjacent to the exterior surface of the duct (pipe 15); and (b) connecting the object (pipe 11) to the device 10 utilizing the object connecting means (FIP adapter 24).

In some cases, such as cases where only minimal contact may be present between the sealing member 50 and the exterior surface of the duct (pipe 15) because of minimum duct (pipe 15) size, supplemental duct sealing means may be utilized to provide or enhance the seal between the sealing member 50 and the duct (pipe 15) to make it fluid-tight. Examples of such means include adhesive, glue, epoxy or other joining compound or a combination of such means that is stored in a container or other receptacle, such as tube 90 illustrated in FIG. 15. Generally, the user of the device 10 removes the lid from the container 90, places some of the adhesive from the container 90 on the exterior portion of the duct (pipe 15) at the end 17 thereof or on the interior surface 50a of the sealing member 50 where contact with the duct (pipe 15) is anticipated or on both of such surfaces. The duct (pipe 15) is then inserted into the device in the manner described above, preferably with a twisting motion. As the duct (pipe 15) is inserted, the adhesive is spread over the adjacent surfaces so that a film or layer of adhesive 91 is created between the interior surface 50a of the sealing member 50 and the duct (pipe 15). It should be noted that before the adhesive sets, it may also act as a lubricant, allowing the duct (pipe 15) to be more easily inserted into the sealing member 50. The adhesive film 91 may provide for a relatively permanent attachment of the sealing member 50 to the duct (pipe 15), so that the sealing member 50 is not easily removed from the duct (pipe 15). An example of this type of adhesive is Cyanoacrylate (methyl-2-cyanoacrylate), which may be typically sold under the trademark SUPERGLUE. Alternatively, the adhesive film 91 may provide for non-permanent attachment of the sealing member 50 to the duct (pipe 15), so that the sealing member 50 is relatively easily removed from the duct (pipe 15) after use of the device 10 is completed. An example is an adhesive similar to rubber cement made from a polymer (such as latex) mixed in a solvent such as acetone, hexane, heptane or benzene to keep the polymer fluid prior to use.

In addition, as is illustrated in FIG. 16, the interior surface 1250a of the sealing member 1250 may have an adhesive layer 1257 and a peel-off strip 1258 positioned over the adhesive layer 1257 on the portions of the interior surface 1250a of the sealing member 1250 that are anticipated to be in contact with the duct (not illustrated) when it is inserted into the sealing member 1250. The adhesive layer 1257 is comprised of any suitable adhesive and the peel-off strip 1258 is positioned over the adhesive layer to protect it and keep it from setting or drying out during storage prior to use of the device. Preferably, the adhesive layer 1257 is comprised of an adhesive material that is resistant to the fluid contained in the duct and the peel-off strip 1258 is comprised of paper or a polymer material. For example, the adhesive layer 1257 and peel-off strip 1258 may be comprised of double coated urethane, vinyl or polyethylene adhesive tapes with release liners, such as those manufactured by the 3M Company. A portion 1258a of the peel-off strip 1258 extends from the adhesive layer 1257 through the wider open end 1253 and the duct opening (not illustrated) to an area outside the interior space of the device. In operation, and prior to inserting the duct into the device, the user of the device pulls on the portion 1258a of the peel-off strip 1258 that extends through the duct opening until the peel-off strip 1258 is removed from the device, exposing the adhesive layer 1257. The duct is then inserted into the device as described above and illustrated in connection with FIG. 2 and FIG. 15. The duct is preferably rotated as the sealing member 1250 is being compressed against the exterior surface of the duct. The adhesive in the adhesive layer 1257 adheres to the surface at the distal end of the duct, as well as the adjoining surface 1250a of the sealing member 1250. When the adhesive in the adhesive layer 1257 is allowed to set, the adhesive provides a supplemental duct sealing means that may be more appropriate for smaller sizes of ducts or for use at higher operating pressures of the device. It is to be noted that in other embodiments of the present invention, an adhesive layer 1257 may be utilized with the sealing member 1250 without a peel-off strip 1258. This may be the case where the type of adhesive used in the adhesive strip 1257 will not readily dry out during storage. In some embodiments, the device may be enclosed within air-evacuated, fluid-tight packaging (such as a removable cap positioned at each opening of the device) to prevent the adhesive from drying out. The adhesive layer 1257 may provide for a relatively permanent attachment of the sealing member 1250 to the duct, so that the sealing member 1250 is not easily removed from the duct, or it may provide for a removable attachment of the duct to the sealing member 1250 in the manner described above.

Referring again to FIG. 2 and FIG. 15, after the supplemental duct sealing means, if any, has been used to seal the duct (pipe 15) to the device 10, and the object (pipe 11) has been connected to the casing member 20 using the object connecting means (HP adapter 24), fluids may be transmitted from the interior space 16 of the duct (pipe 15) to the interior space 12 of the object (pipe 11), or vice versa, in a manner that provides a fluid-tight seal between the duct (pipe 15) and the object (pipe 11). When the fluid in the device 10 and pipes 11, 15 is operating under pressure and there is little resistance to the flow of fluids in the pipes 11, 15, there is not a relatively great pressure (or thrust) loading along the longitudinal axis of the device 10 tending to pull the device 10 from the pipe 15. As pressure builds within the interior space 12, 16 of the pipes 11, 15, respectively, such as when a valve (not illustrated) is closed on the pipe 11 (when flow is from pipe 15 to pipe 11), the thrust loading along the longitudinal axes of the pipe 15 and the device 10 also increases. As the pressure in the interior space 12, 16 of the pipes 11, 15, respectively, increases, the increasing fluid pressure is also transmitted to the chamber 40 as fluid flows or is compressed into the chamber 40 bounded by the sealing member 50 and the case body 21 (including the HP adapter 24). As the pressure builds in the chamber 40, increasing pressure is also exerted against the exterior surface 50b of the sealing member 50. The increasing pressure on the sealing member 50 produces a radially inward force against the exterior surface of the duct (pipe 15), tending to operatively hold the pipe 15 in place relative to the device 10 by friction. This radially inward force also assists in maintaining a fluid tight seal between the duct (pipe 15) and the sealing member 50 of the device 10 in spite of the increasing thrust load. The internal support means (cover plate 60 and support assembly 70 in this embodiment) also act to operatively hold the duct (pipe 15) and the sealing member 50 in place relative to the casing member 20, so that the sealing member 50 does not undergo excessive deformation in the longitudinal direction when thrust loads increase. For example, in this embodiment, as best illustrated in FIG. 15, the perimeter plate support portion 61 of the cover plate 60 is positioned approximately adjacent to the seal inlet opening 53 of the sealing member 50 and the tab portions 62 of the cover plate 60 are adapted to deform longitudinally into the interior space of the sealing member 50 as the duct (pipe 15) is inserted into the device 10, so that the tab portions 62 are deformed generally along the longitudinal axis of the duct (pipe 15) and the sealing member 50, as well as radially outward from the duct (pipe 15), as the duct (pipe 15) impinges against the tab portions 62 while continuing its advance into the sealing member 50. As the pressure in the chamber 40 increases, the interior surface 50a of the sealing member 50 may be forced against the tab portions 62, which are forced against the exterior surface of the duct (pipe 15). increasing the resistive force of the tab portions 62 against the sealing member 50. so that the cover plate 60 assists in holding the sealing member 50 in place relative to the duct (pipe 15). It is to be noted that in some embodiments of the device 10, the internal support means (cover plate 60 and support assembly 70 in this embodiment), and not the pressure within the chamber 40, are primarily used to operatively hold the sealing member 50 and the duct (pipe 15) in place relative to the casing member 20. In "operatively" holding in place the sealing member 50 and the duct (pipe 15), it is anticipated that the sealing member 50 and the duct (pipe 15) may change position somewhat relative to one another and the casing member 20, but not an amount great enough to cause failure of the device 10 within its designed operating parameters.

Thus, as is apparent from the foregoing description, the preferred type of sealing member 50 and internal member support means, as well as other structural characteristics of the device 10, are dependent upon numerous different factors. A device 10 having a particular combination of features appropriate for one type of operating condition may not be appropriate for other types of operating conditions.

What is claimed is:

1. A device for connecting to a duct, the duct being comprised of a duct open end and a duct exterior surface adjacent to the duct open end, wherein the size and shape of the duct open end and the duct exterior surface are adapted to be variable within a predetermined range, the device comprising:
   (a) a hollow sealing member further comprised of an interior surface and an exterior surface, each bounded by a wider seal inlet opening and a narrower seal outlet opening, wherein the wider seal inlet opening is adapted to receive the at least one duct, and a portion of the sealing member interior surface is adapted to expand to conform to and be positioned adjacent to the duct exterior surface for ducts having a size and shape of duct open end and duct exterior surface within the predetermined range; and
   (b) a plurality of support members adapted to assist in holding the device operatively in place relative to the duct, wherein the support members are further comprised of:
      (i) a perimeter support member positioned on a surface of the sealing member;
      (ii) a longitudinal support member extending from the perimeter support member; and
      (iii) a radial support member extending from the longitudinal support member into the proximity of the exterior surface of the sealing member.

2. The device of claim 1, wherein a portion the remaining support members extend longitudinally along the sealing member and are adapted to be deformed away from the duct as the duct is inserted into the device and to provide a force radially inward toward the duct exterior surface while the duct is connected to the device.

3. The device of claim 1, wherein at least a portion of each of the remaining support members extends into the proximity of the exterior surface of the sealing member so that such portion is adapted to be positioned adjacent to the exterior surface of the sealing member along all or part of such portion, or is adapted to engage the duct, when the duct is inserted into the device.

4. The device of claim 1, wherein
the perimeter support member is positioned approximately adjacent to the wider seal inlet opening of the sealing member.

5. The device of claim 4, wherein the plurality of support members further comprise a plurality of inlet radial support members that are adapted to be deformed outward from the duct as the duct is inserted into the device.

6. The device of claim 4, wherein the plurality of support members further comprise an outlet radial support member extending from the longitudinal support member and adapted to engage the duct.

7. The device of claim 4, wherein the plurality of support members further comprise:
a duct end support member extending from the longitudinal support member and adapted to limit travel of the duct into the device.

8. The device of claim 1, wherein the sealing member further comprises at least one overlapping portion.

9. The device of claim 1, further comprising:
(a) a perimeter plate support portion having an interior space and being positioned approximately at the wider seal inlet opening of the sealing member; and
(b) a plurality of rigid or semi-rigid tab portions that extend from the perimeter plate support portion into the interior space of the perimeter plate support portion and that are adapted to deform longitudinally in the direction of the sealing member as the duct is inserted into the device.

10. The device of claim 1, wherein the plurality of support members are further comprised of:
(a) an inlet perimeter support member positioned approximately adjacent to the wider seal inlet opening of the sealing member;
(b) a longitudinal support member extending from the inlet perimeter support member; and
(c) an outlet radial support member extending from the longitudinal support member and adapted to engage the duct.

11. The device of claim 10, further comprising:
(a) a perimeter plate support portion having an interior space and being positioned approximately at the wider seal inlet opening of the sealing member; and
(b) a plurality of rigid or semi-rigid tab portions that extend from the perimeter plate support portion into the interior space of the perimeter plate support portion and that are adapted to deform longitudinally in the direction of the sealing member as the duct is inserted into the device.

12. A device for connecting to a duct, the duct comprising a duct open end and a duct exterior surface adjacent to the duct open end, the device comprising:
(a) a hollow sealing member comprising an interior surface and an exterior surface and having a seal inlet opening and a seal outlet opening, wherein the seal inlet opening of the sealing member is adapted to receive the duct open end, and a portion of the sealing member interior surface is adapted to conform to the shape of and be positioned adjacent to the duct exterior surface, which has a size and shape adapted to be variable within a predetermined range, and the device is adapted to be connected to ducts having an exterior surface size and shape within the predetermined range; and
(b) at least one cover plate adapted to assist in holding the device operatively in place relative to the sealing member and being further comprised of (i) a perimeter plate support portion having an interior space and being positioned approximately adjacent to the seal inlet opening, and (ii) a plurality of tab portions extending from the perimeter support portion into the interior space of the perimeter support portion and being adapted to deform longitudinally into the interior space of the sealing member as the duct is inserted into the device and to be positioned adjacent to both the exterior surface of the duct and the interior surface of the sealing member while the duct is connected to the device.

13. The device of claim 12, further comprising a support assembly, at least a portion of which is adapted to be positioned adjacent to the duct or the exterior surface of the sealing member or both while the duct is connected to the device, and the support assembly is further adapted to assist in holding the duct operatively in place relative to the sealing member.

14. The device of claim 13, wherein the support assembly is further comprised of:
(a) an inlet perimeter support member positioned approximately adjacent to the seal inlet opening of the sealing member; and
(b) a plurality of support members extending from the inlet perimeter support member and being adapted to be deformed away from the duct as the duct is inserted into the device.

15. The device of claim 12, wherein the sealing member further comprises at least one overlapping portion.

16. The device of claim 12, wherein the sealing member further comprises at least one rigid or semi-rigid seal support member extending longitudinally along a surface of the sealing member or longitudinally within the sealing member, or both, and the at least one seal support member is adapted to assist in holding the duct operatively in place relative to the sealing member.

17. The device of claim 12, further comprising at least one member selected from the group consisting of foam support members, compressible inserts, or any combination thereof, wherein the at least one member is adapted to be positioned adjacent to all or a portion of the exterior surface of the sealing member.

18. A device for connecting to a duct, the duct comprising a duct open end and a duct exterior surface adjacent to the duct open end, wherein the size and shape of the duct open end and the duct exterior surface are adapted to be variable within a predetermined range, the device comprising:
(a) a hollow sealing member having a seal inlet opening and a seal outlet opening and further comprising an interior surface, an exterior surface, and at least one overlapping portion adapted to form a seal around the duct exterior surface, wherein the seal inlet opening is adapted to receive the duct open end, and a portion of the sealing member interior surface is adapted to conform to and be positioned adjacent to the duct exterior surface, which has a size and shape within the predetermined range; and
(b) a support structure adapted to assist in holding the sealing member and the duct operatively in place relative to one another.

19. The device of claim 18, further comprising at least one expandable member adapted to assist in holding the at least one overlapping portion of the sealing member operatively in place.

20. The device of claim 18, wherein the support structure is further comprised of internal support means adapted for assisting in holding the device and the duct operatively in place relative to one another.

21. The device of claim 20, wherein the internal support means are further comprised of: (a) at least one seal support member extending along the interior surface of the sealing member; or (b) a cover plate having an interior space and being positioned approximately adjacent to the seal inlet opening, the at least one cover plate further comprising a plurality of tab portions extending into the interior space of the cover plate; or (c) a combination of (a) and (b).

22. The device of claim 20, wherein the internal support means further comprise a support assembly, at least a portion of which is positioned on the exterior surface of the sealing member approximately adjacent to the seal inlet opening, and at least a remaining portion of which extends from such position into the proximity of the sealing member, so that such remaining portion of the support assembly is adapted to be deformed away from the duct as the duct is inserted into the device and is adapted to exert a force radially inward against the duct while the duct is connected to the device.

23. The device of claim 20, wherein the sealing member further comprises at least one rigid or semi-rigid seal support member incorporated as a part of the sealing member and extending along a surface of the sealing member or within the sealing member, or both.

24. The device of claim 20, wherein the internal support means are comprised of at least one foam support member or at least one compressible insert, or any combination thereof, that is adapted to be positioned adjacent to all or a portion of the exterior surface of the sealing member while the duct is connected to the device.

25. The device of claim 18, wherein the sealing member is comprised of:
(a) a hollow seal transitional portion having an approximately hyperboloid or frusto-conical shape and being bounded by the seal inlet opening and a narrower open end; and
(b) a seal adhering portion having an approximately tubular shape that is adjacent to and extends longitudinally from the narrower open end of the seal transitional portion.

26. A device for connecting to at least one duct, the at least one duct comprising a duct open end and a duct exterior surface adjacent to the duct open end, wherein the duct open end and the duct exterior surface have a size and shape that are adapted to be variable within a predetermined range, the device comprising:
(a) a casing member having a casing interior space and at least one casing duct opening adjoining the casing interior space; and
(b) variable connecting means for connecting the device to the at least one duct, which has a duct open end and a duct exterior surface size and shape within the predetermined range, wherein the variable connecting means are positioned approximately within the at least one casing duct opening and are further comprised of a hollow sealing member;
(c) wherein the hollow sealing member is further comprised of at least one overlapping portion and the at least one overlapping portion of the sealing member is adapted to expand to conform to the shape of and be positioned adjacent to the duct exterior surface while the at least one duct is inserted into the device.

27. The device of claim 26, wherein the variable connecting means are further comprised of internal support means adapted for assisting in holding the at least one duct operatively in place relative to the device.

28. The device of claim 26, wherein the sealing member further comprised of a seal inlet opening and the variable connecting means are further comprised of a cover plate positioned approximately adjacent to the seal inlet opening.

29. The device of claim 26, wherein the variable connecting means are further comprised of a support assembly positioned within the casing interior space and adapted to assist in holding the at least one duct operatively in place relative to the device.

30. The device of claim 29, wherein the support assembly is further comprised of at least two support subassemblies.

31. The device of claim 26, wherein the sealing member further comprises an interior surface and the device further comprises supplemental duct sealing means adapted for producing a fluid-tight seal between a portion of the interior surface of the sealing member and the at least one duct.

32. The device of claim 26, wherein the casing member further comprises:
(a) at least one object opening adjoining the casing interior space; and
(b) object connecting means adapted for connecting at least one object to the casing member at the at least one casing object opening;
(c) wherein the at least one object has an object interior space and is comprised of an object open end adjoining the object interior space, and the interior space of the at least one duct and the object interior space are both in fluid-communication with a chamber formed within a portion of the casing interior space.

33. The device of claim 26, further comprising at least one expandable member adapted to assist in holding the at least one overlapping portion of the sealing member operatively in place.

34. A device for connecting to at least one duct, the at least one duct comprising a duct open end and a duct exterior surface adjacent to the duct open end that have a size and shape adapted to be variable within a predetermined range, the device comprising:
(a) a casing member having a casing interior space and at least one casing duct opening adjoining the casing interior space;
(b) a hollow sealing member further comprised of:
(i) a seal transitional portion having an approximately hyperboloid or conical shape and being bounded by a wider seal inlet opening and a narrower open end; and
(ii) a seal adhering portion having an approximately tubular shape that extends longitudinally from the narrower open end of the seal transitional portion;
(iii) wherein the wider seal inlet opening is positioned approximately adjacent to the casing member at the at least one casing duct opening and is adapted to receive the at least one duct, which may have any duct open end and duct exterior surface size and shape within the predetermined range, and a portion of the sealing member is adapted to conform to the shape of and be positioned adjacent to the duct exterior surface; and
(c) internal support means adapted for assisting in holding the device operatively in place relative to the at least one duct.

35. The device of claim 34, further comprising internal member connecting means for removably or permanently connecting the sealing member or the internal support means, or both, to the casing member.

36. The device of claim 34, wherein the internal support means are further comprised of a support assembly positioned within the interior space of the casing member and at least a portion of the support assembly is adapted to deform outward from the at least one duct as the at least one duct is inserted into the device and to exert a force radially inward against the at least one duct while the at least one duct is connected to the device.

37. The device of claim 36, wherein the support assembly is further comprised of at least two support subassemblies.

38. The device of claim 34, further comprising:
  (a) a perimeter plate support portion having an interior space, wherein the perimeter plate support portion is positioned approximately at the seal inlet opening of the sealing member; and
  (b) a plurality of tab portions that extend from the perimeter plate support portion into the interior space of the perimeter plate support portion.

39. The device of claim 34, wherein the sealing member further comprises at least one overlapping portion.

40. A device for connecting to at least one duct, the at least one duct comprising a duct open end and a duct exterior surface adjacent to the duct open end, the duct open end and the duct exterior surface having a size and shape that are adapted to be variable within a predetermined range, the device comprising:
  (a) a casing member having a casing interior space and at least one casing duct opening adjoining the casing interior space; and
  (b) an internal member positioned approximately within the at least one casing duct opening and being further comprised of:
    (i) a hollow sealing member comprised of:
      (A) a seal transitional portion having an approximately hyperboloid or conical cross-sectional shape and being bounded by a wider seal inlet opening and a narrower open end; and
      (B) a seal adhering portion extending longitudinally from the narrower open end of the seal transitional portion, the seal adhering portion having an approximately tubular cross-sectional shape and being bounded by an adhering portion open end and a seal outlet opening, wherein the adhering portion open end is adjacent to the narrower open end of the seal transitional portion and has the same approximate interior shape and size as said narrower open end, and the seal inlet opening is positioned approximately adjacent to the casing member at the at least one casing duct opening and is adapted to receive the at least one duct, which may have any duct open end and duct exterior surface size and shape within the predetermined range, and a portion of the sealing member is adapted to conform to and be positioned adjacent to the duct exterior surface; and
    (ii) a support assembly positioned within the casing member and adapted for assisting in holding the at least one duct operatively in place relative to the device; and
    (iii) a seal support member extending along the interior surface of the sealing member, or a cover plate positioned approximately adjacent to the seal inlet opening and comprising a plurality of tab portions extending into an interior space of the cover plate, or a combination of the seal support member and the cover plate.

41. The device of claim 40, wherein the support assembly further comprises a plurality of rigid or semi-rigid support members positioned approximately adjacent to the seal inlet opening or the casing member or any combination thereof and extending therefrom into the proximity of the sealing member.

42. The device of claim 41, wherein the plurality of rigid or semi-rigid support members further comprise a plurality of radial support members that are positioned in the proximity of the sealing member so that the radial support members are deformed radially away from the at least one duct as the at least one duct is inserted into the device.

43. The device of claim 40, wherein the support assembly is further comprised of at least one seal support member that is incorporated as a part of the sealing member.

44. The device of claim 40, wherein the sealing member further comprises at least one overlapping portion.

45. A device for connecting to at least one duct, the at least one duct comprising a duct open end and a duct exterior surface adjacent to the duct open end, wherein the duct exterior surface has a size and shape that are adapted to be variable within a predetermined range, the device comprising:
  (a) a case body having a casing interior space and at least one case body open end;
  (b) at least one case cap having a casing duct opening, wherein the casing duct opening is of a size and shape adapted to receive the duct open end;
  (c) case cap connecting means for permanently or removably connecting the at least one case cap to the case body at the at least one case body open end;
  (d) an internal member positioned approximately within the at least one case body open end and extending into the casing interior space, wherein the internal member is further comprised of:
    (i) a hollow sealing member further comprised of:
      (A) a seal transitional portion having an approximately hyperboloid or conical shape and being bounded by a wider seal inlet opening and a narrower open end
      (B) a seal adhering portion having an approximately tubular shape that extends longitudinally from the narrower open end of the seal transitional portion;
      (C) an overlapping portion adapted to conform to the shape of the at least one duct; and
      (D) an interior surface and an exterior surface bounded by the wider seal inlet opening and a narrower seal outlet opening, wherein the perimeter of the wider seal inlet opening is positioned approximately adjacent to the case body open end, and a portion of the sealing member is adapted to elastically conform to the shape of and be positioned adjacent to the duct exterior surface while the at least one duct is connected to the device;
    (ii) a support assembly positioned in the interior space of the case body and adapted to assist in holding the device operatively in place relative to the at least one duct;
    (iii) wherein the internal member is adapted to operatively receive the at least one duct having a duct open end and a duct exterior surface of a size and shape within the predetermined range; and
  (e) internal member connecting means for connecting the internal member to the casing member.

46. The device of claim 45, wherein the support assembly is comprised of at least one structural member that generally extends along the sealing member.

47. The device of claim 46, wherein the structural member extending along the sealing member is further comprised of a compressible insert, a foam support member, a seal support member, a longitudinal support member, or a radial support member, or any combination thereof.

48. The device of claim 45, wherein the support assembly is further comprised of:
(a) a compressible insert, a foam support member, a longitudinal support member, or a radial support member, or any combination thereof; or
(b) a seal support member incorporated as a part of the sealing member that extends longitudinally along the sealing member; or
(c) any combination of (a) and (b).

49. The device of claim 45, wherein the case cap connecting means are comprised of threads on a tubular-shaped exterior portion of the case body approximately adjacent to the at least one case body open end and corresponding threads on an interior surface of the at least one case cap, so that the at least one case cap is adapted to be screwed onto the case body at the at least one case body open end.

50. The device of claim 45, further comprising a cover plate positioned approximately adjacent to the wider seal inlet opening, wherein the cover plate has an interior space and is further comprised of a plurality of tab portions extending into the interior space of the cover plate that are adapted to deform longitudinally in the direction of the sealing member as the at least one duct is inserted into the device.

51. The device of claim 45, wherein the internal member connecting means are comprised of a portion of the internal member being compressed between a portion of the case body and a portion of the case cap while the case cap is connected to the case body.

52. A method of using the device of claim 45, the method comprising the steps of:
(a) positioning an internal member approximately within the at least one case body open end; and
(b) connecting the case cap to the case body at the at least one case body open end utilizing the case cap connecting means.

53. The device of claim 45, wherein the sealing member further comprises at least one overlapping portion.

54. A device for connecting to a duct, the duct being comprised of a duct open end and a duct exterior surface adjacent to the duct open end, wherein the size and shape of the duct open end and the duct exterior surface are adapted to be variable within a predetermined range, the device comprising:
(a) a hollow sealing member further comprised of an interior surface and an exterior surface, each bounded by a wider seal inlet opening and a narrower seal outlet opening, and an overlapping portion adjacent to the duct, wherein the wider seal inlet opening is adapted to receive the at least one duct, and a portion of the sealing member interior surface is adapted to conform to and be positioned adjacent to the duct exterior surface for ducts having a size and shape of duct open end and duct exterior surface within the predetermined range;
(b) an expandable member adapted to assist in holding the overlapping portion of the sealing member operatively in place; and
(c) a plurality of support members adapted to assist in holding the device operatively in place relative to the duct, wherein at least one of the support members is positioned on a surface of the sealing member and the remaining support members extend from the at least one support member into the proximity of the exterior surface of the sealing member.

55. The device of claim 54, wherein the remaining support members extend longitudinally along the sealing member and are adapted to be deformed away from the duct as the duct is inserted into the device and to provide a force radially inward toward the duct exterior surface while the duct is connected to the device.

56. The device of claim 54, wherein:
(a) the at least one support member further comprises an inlet perimeter support member positioned approximately adjacent to the wider seal inlet opening of the sealing member; and
(b) the remaining support members extend from the inlet perimeter support member.

57. The device of claim 56, wherein the remaining plurality of support members further comprise a rigid or semi-rigid longitudinal support member extending from the inlet perimeter support member, and an outlet radial support member extending from the longitudinal support member and adapted to engage the duct.

58. The device of claim 56, wherein the remaining plurality of support members further comprise:
(a) a rigid or semi-rigid longitudinal support member extending from the inlet perimeter support member; and
(b) a duct end support member extending from the longitudinal support member and adapted to limit travel of the duct into the device.

59. The device of claim 54, further comprising:
(a) a perimeter plate support portion having an interior space and being positioned approximately at the wider seal inlet opening of the sealing member; and
(b) a plurality of rigid or semi-rigid tab portions that extend from the perimeter plate support portion into the interior space of the perimeter plate support portion and that are adapted to deform longitudinally in the direction of the sealing member as the duct is inserted into the device.

60. A device for connecting to a duct, the duct being comprised of a duct open end and a duct exterior surface adjacent to the duct open end, wherein the size and shape of the duct open end and the duct exterior surface are adapted to be variable within a predetermined range, the device comprising:
(a) a hollow sealing member further comprised of:
(i) a seal transitional portion having an approximately hyperboloid or conical shape and being bounded by a wider seal inlet opening and a narrower open end;
(ii) a seal adhering portion extending longitudinally from the narrower open end of the seal transitional portion, the seal adhering portion having a tubular shape and being bounded by an adhering portion open end and a seal outlet opening; and
(iii) an interior surface and an exterior surface, wherein the adhering portion open end is adjacent to the narrower open end of the seal transitional portion and has the same interior shape and size as said narrower open end, the wider seal inlet opening is adapted to receive the at least one duct, and a portion of the sealing member interior surface is adapted to be positioned adjacent to the duct exterior surface for ducts having a size and shape of duct open end and duct exterior surface within the predetermined range; and
(b) a plurality of support members adapted to assist in holding the device operatively in place relative to the duct, wherein at least one of the support members is positioned on a surface of the sealing member and the remaining support members extend from the at least one support member into the proximity of the exterior surface of the sealing member.

61. The device of claim 60, wherein the sealing member further comprises:
(a) at least one overlapping portion adapted to be positioned adjacent to the duct exterior surface; and
(b) at least one expandable member adapted to assist in holding the at least one overlapping portion of the sealing member operatively in place.

* * * * *